United States Patent
Dorsey et al.

[19]

[11] Patent Number: 6,008,550
[45] Date of Patent: Dec. 28, 1999

[54] HOTSWAPPABLE CHASSIS AND ELECTRONIC CIRCUIT CARDS

[75] Inventors: Paul C. Dorsey, Merrimack, N.H.; Kevin M. Frazier, Reading, Mass.; David J. Breig, Maple Grove, Minn.; Mehmet H. Duymazlar, Nashua, N.H.

[73] Assignee: Cabletron Systems, Inc., Rochester, N.H.

[21] Appl. No.: 09/276,335

[22] Filed: Mar. 25, 1999

[51] Int. Cl.[6] ........................................... H01H 7/00
[52] U.S. Cl. ............................................... 307/141
[58] Field of Search ................... 363/144, 146, 363/147; 307/140, 141, 141.4, 143, 147

[56] References Cited

U.S. PATENT DOCUMENTS

| | | | |
|---|---|---|---|
| 3,958,858 | 5/1976 | Silveira, Jr. .................. | 339/186 M |
| 4,704,599 | 11/1987 | Kimmel et al. ................ | 307/140 |
| 4,716,495 | 12/1987 | Craker .......................... | 439/327 |
| 5,272,584 | 12/1993 | Austruy et al. ................ | 323/908 |
| 5,287,009 | 2/1994 | Heung ........................... | 307/141 |
| 5,423,697 | 6/1995 | MacGregor .................... | 439/638 |
| 5,473,499 | 12/1995 | Weir .............................. | 323/908 |
| 5,519,264 | 5/1996 | Heyden et al. ................ | 307/125 |
| 5,530,302 | 6/1996 | Hamre et al. .................. | 307/147 |
| 5,559,660 | 9/1996 | Watson et al. ................. | 323/908 |
| 5,671,368 | 9/1997 | Chan et al. .................... | 395/283 |
| 5,703,769 | 12/1997 | Murray .......................... | 323/908 |
| 5,721,458 | 2/1998 | Kearney et al. ............... | 395/283 |
| 5,721,502 | 2/1998 | Thomson et al. .............. | 327/143 |
| 5,910,690 | 6/1999 | Dorsey et al. ................. | 307/141 |

*Primary Examiner*—Matthew Nguyen
*Attorney, Agent, or Firm*—Wolf, Greenfield & Sacks, P.C.

[57] ABSTRACT

A system for controlling power application to an electronic component during a hotswap operation. A chassis contains a plurality of slots for interfacing with electronic components, each slot having an associated timing device. The electronic component contains a delay mechanism, such that when the electronic component interfaces with a slot in the chassis, the delay and timing mechanisms interact to create a slot timing circuit. The slot timing circuit interfaces to a ramp-up switching circuitry to produce a controlled application of power to remaining circuitry of the electronic component. The timing mechanism may be a resistor and the delay mechanism may be a capacitor, such that an RC circuit is formed which controls, in a time delayed fashion, a switching mechanism which in turn controls ramp-up of power application to the electronic component. Furthermore, each timing mechanism of each slot in the chassis may have a different timing value, such that power application to multiple electronic components, inserted simultaneously into the chassis, may have power applied in a staggered fashion, to prevent inrush and surge currents to the power supply. Still further, each switching mechanism of an electronic component may have an associated power control circuit, which when activated by the slot timing circuit, controls ramp-up of power application to remaining circuitry of the electronic component in a controlled fashion.

5 Claims, 18 Drawing Sheets

HOTSWAPPABLE CHASSIS AND ELECTRONIC CIRCUIT CARDS

FIELD OF THE INVENTION

This invention relates to a method and apparatus for the insertion and removal of unpowered electronic circuit components into a powered electronic circuit component. More particularly, the invention allows an unpowered circuit card to be inserted into a powered sub-chassis or powered main-chassis, and an unpowered sub-chassis to be inserted into a powered main chassis, without disrupting the main chassis power.

BACKGROUND OF THE INVENTION

It is often desirable to add and/or remove components from an electrical system without disrupting the system power. The term "hotswappable" refers to this ability to insert unpowered electronics, or remove powered electronics, from a powered system without disrupting the system power.

Certain problems typically arise when inserting and removing components in a powered electronic system. Inserting an unpowered electronic component may temporarily reduce the system power voltage level below an acceptable limit and cause actively-functioning components in other parts of the system to fail. A voltage reduction occurs because an instantaneous current (the "inrush current") is required to charge the capacitance of the circuits within the newly-inserted component. Uncontrolled inrush current is characterized by a current spike which the system power source is unable to supply, therefore resulting in a voltage drop in the overall system.

FIG. 1 shows a chassis system commonly used in computer and computer networking environments. Main-chassis 1 is a mechanical enclosure which houses one or more power supplies (not shown) and a back-plane circuit card (not shown) which is used to connect and provide power to electronic circuit cards 2–4 and sub-chassis 5. Sub-chassis 5 is a cage which may contain multiple electronic circuit cards (none are shown in FIG. 1), and which can be inserted into the larger main-chassis 1. The electronic circuit cards 2–4 are usually printed circuit cards populated with electronic components. Main-chassis power refers to the power on the main-chassis back plane which is supplied to all of the electronic components residing within the main-chassis.

An exploded view of FIG. 1A shows a single center guide rail 7 mounted on top and bottom portions of the sub-chassis 5, and inner parallel card guides 8 located along top and bottom portions of main-chassis 1. The card guides 8 and center guide rail 7 cooperate to guide the sub-chassis into the main-chassis. Handles 10 are present on the top and bottom of a sub-chassis to assist with insertion and removal. Upon full insertion, the sub-chassis backplane 9 electrically interfaces with the main-chassis backplane.

The main-chassis card guides 8 also allow the insertion of electronic circuit cards 2–4 directly into the main-chassis. In this case, outside edges of the cards slide along the card guides 8, enabling direct electrical interface of the cards and main-chassis backplane upon full insertion.

FIG. 2 shows electronic circuit cards 11–13 being inserted into sub-chassis 5 along sub-chassis card guides 6. An electrical interface is formed between the card and backplane of the sub-chassis when the card is fully inserted. In FIG. 2, sub-chassis 5 has three slots, each containing one of circuit cards 11–13. A "slot" in a sub-chassis or main-chassis is generally defined by the card guides (6 or 8) located on the top and bottom of the chassis. Usually, a single circuit card is said to "occupy" or "be mounted in" a single slot in a chassis when fully inserted. The left-most slot of the sub-chassis in FIG. 2 contains partially inserted circuit card 11. The middle and right-most slots contain fully inserted circuit cards 12 and 13, respectively. A sub-chassis, having one or more circuit cards inserted therein so as to electrically interface with the backplane of the sub-chassis, is said to be "populated". Oftentimes, the slots contained within a chassis (main- or sub-) are numbered from 1–N, where N is the total number of slots which the chassis contains. Those skilled in the art will understand that many different configurations are possible when mounting electronic circuit cards and sub-chassis combinations into a main-chassis.

An unpowered electronic circuit component may be modeled as a single large capacitor for understanding the inrush current phenomena during the application of power. A capacitor has the current/voltage relationship: $I = C\, dv/dt$. When a circuit card has power instantaneously applied (emulating an insertion during hotswap), $dv/dt$ (the change in voltage per change in time) is very large; this causes a large instantaneous (inrush) current. The inrush current will disappear as the capacitor is charged. When many circuit cards are placed in a sub-chassis, the draw on the power supply is even greater. Inserting an uncharged sub-chassis containing many circuit cards into a powered main-chassis backplane is similar to a momentary short circuit across the main-chassis power supply due to the instantaneous current required to charge the capacitance of the sub-chassis and its circuit cards. Because the power source cannot respond to this instantaneous current demand, the backplane voltage drops. Once the instantaneous current requirement is satisfied, then the power source will again be able to supply the correct voltage to the backplane; however, because of the prior voltage drop, the functioning of previously-operating circuitry can no longer be guaranteed.

There are various prior art approaches to hotswapping. However, the prior art deals generally with single card hot-swaps. There has not been a satisfactory solution to the problem of hotswapping a populated sub-chassis without disrupting the electronic activity of powered and functioning electronic circuit cards already populated and functioning in a powered main-chassis or sub-chassis.

SUMMARY OF THE INVENTION

According to one embodiment of the present invention, a system is provided for controlling power application to circuit cards inserted into slots of a chassis. The cards may be inserted into slots of a main chassis or slots of a sub-chassis which is then inserted into a main-chassis. Power application is activated for each card in each slot at a different time from the other cards, by means of a combined timing and delay circuit formed by joining the card and chassis. This reduces the load on the power supply. One particular advantage is the ability to insert any card in any slot—i.e., there are no limitations on where a particular card may be inserted.

After power application has been initiated for a circuit card, the power is applied in a controlled, ramped-up fashion to allow the power supply to cope with the initial inrush current requirements produced by the remaining uncharged circuitry on the card. The delayed application of power to each card is caused by a circuit formed upon insertion of the cards into the chassis.

In a hotswappable system according to any of the following embodiments, electronic circuit cards and/or sub-chassis may be inserted in an unpowered state or removed in a powered state into the sub-chassis or main-chassis without disrupting power to other electronic components of the system.

In one embodiment, the chassis has a plurality of slots to interface with circuit cards. Each slot contains a chassis power connection and a chassis ground connection which connect with corresponding circuit card power and ground connections, upon card insertion. Each slot also has an associated timing mechanism and each circuit card has an associated delay mechanism; together they provide an output which controls a main switching mechanism on the circuit card. The timing mechanism has an input coupled to the chassis power connection. Upon insertion of a card in the slot, the timing mechanism produces a timing output which is coupled to an input of the delay mechanism, to form a slot timing circuit. Upon power application, the timing and delay mechanism combination (slot timing circuit) causes a delay in activation of a switch control to the main switching mechanism. The switch control input is coupled to and receives power from the card power connection; the switch control output is coupled to remaining circuitry on the card. Power returns to the card ground connection from the remaining circuitry. After the slot timing circuit delay, the switch control of the main switching mechanism is activated to allow a power control circuit in the main switching mechanism to ramp-up power to the remaining circuitry on the card.

In a more specific embodiment, the timing mechanism (of each slot) is a resistor and the delay mechanism (of each circuit card) is a capacitor. Upon card insertion into a slot, a slot timing RC circuit is formed which creates the delay in activation of the switch control. Each resistor for each slot contains a different resistance value, thus creating different RC delay times for each slot. This staggers the application of power to circuit cards in the chassis.

In another specific embodiment, after the delay has expired for the slot timing circuit, power is applied to the circuitry of the card in a controlled, ramped-up fashion. The means for controlling includes an activate control coupled to the input of the main switching mechanism, an activate output coupled to ground, and an activate input coupled to a ramp-up control. The activate control has a closed state wherein the ramp-up control is placed in an open state, and an open state wherein the ramp-up control is placed in a closed state. Operation of this timing and delay circuit allows a smooth, ramped-up application of power to the card's remaining circuitry.

The present invention's hotswappable solution may function in any of the following configurations: an electronic circuit card being inserted into a sub-chassis; an electronic circuit card being inserted directly into a main-chassis; and a sub-chassis containing one or more electronic circuit cards being inserted into the main-chassis.

The power supply voltage level in most common microelectronic circuitry applications is +5 volts. The voltage level of the power supply is an indication of power, where Power (P)=Voltage (V)*Current (I). Acceptable supply voltage levels may vary, but should usually be maintained within plus or minus five percent (5%) to allow for proper functioning of all circuitry. Thus, in a common +5 volt system, the minimum acceptable voltage level is +4.75 volts and the maximum acceptable voltage level is +5.25 volts. The present invention enables the insertion of one or more cards (and/or subchassis) while maintaining the system voltage within the above designated limits. The present invention will work for other voltages as well.

These and other features and advantages of the present invention shall appear from the following detailed description and drawings.

DETAILED DESCRIPTION

Figure 3:
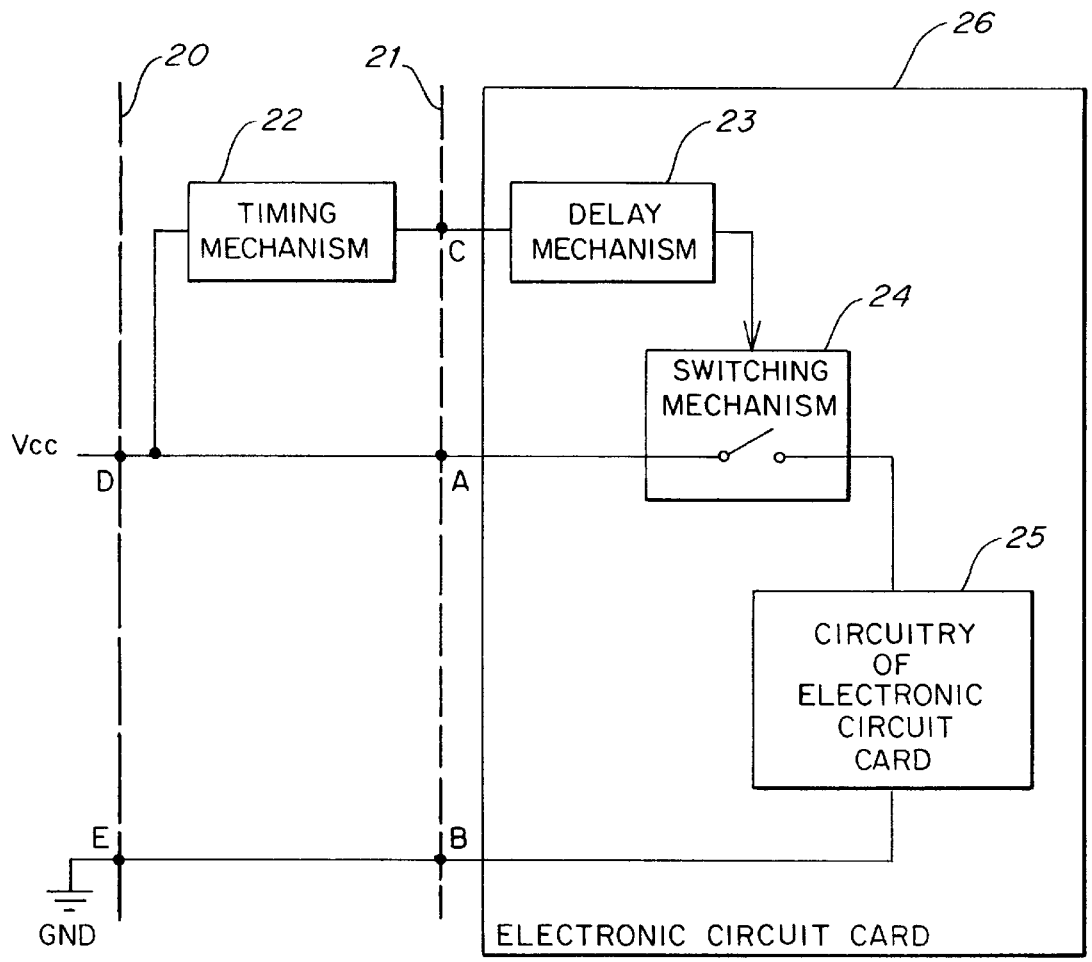
FIG. 3 is a schematic circuit diagram of a hotswap mechanism having a timing, delay and switching mechanism for use in an electronic circuit card, a sub-chassis and a main-chassis configuration, according to the present invention.

FIG. 3 is a schematic diagram of one embodiment of the present invention. This embodiment illustrates certain concepts of the present invention in a simple form, and is useful toward an understanding of other more complex embodiments disclosed hereinafter.

FIG. 3 shows one electronic circuit card 26 inserted in an individual slot (not shown) of a sub-chassis (not shown) and electrically connected to sub-chassis backplane 21 at connection points A, B and C. The sub-chassis and sub-chassis backplane 21 are inserted and electrically coupled to a main-chassis (not shown) having a main-chassis backplane 20 at connection points D and E. The line between points A and D is connected to a power supply (not shown) of the main chassis, labeled as Vcc in FIG. 3. The line between points B and E connects to ground within the main-chassis, labeled as GND in FIG. 3. The couplings between: a) the electronic circuit card 26 and the sub-chassis backplane 21; and b) the sub-chassis backplane and the main-chassis backplane 20, may be achieved with electrical connector interfaces known to those skilled in the art. Only the connections which are relevant to a description of the present invention are shown; additional connections between the chassis backplanes themselves, and between the backplanes and circuit cards, may exist and be used for other reasons.

A timing mechanism 22 according to the present invention is mounted to the sub-chassis backplane 21. Upon insertion of sub-chassis backplane 21 into the main-chassis backplane 20, timing mechanism 22 has a timing input connected to power supply Vcc through connection point D. The electronic circuit card 26 contains a delay mechanism 23 according to the present invention. Upon insertion of card 26 into sub-chassis 21, connection point C is made between the backplane 21 and card 26 which connects the timing output of timing mechanism 22 with the delay input of delay mechanism 23. The delay output of delay mechanism 23 is used to control main switching mechanism 24, also located on the circuit card. As shown in FIG. 3, when the sub-chassis and circuit card are fully inserted, Vcc power is also connected to the switch input of switching mechanism 24, through power connection point A. The switch output of switching mechanism 24 connects to the power input of remaining circuitry 25, on the circuit card 26. The output of circuitry 25 connects, through sub-chassis backplane 21 at ground connection point B, through main-chassis backplane 20 at ground connection point E, and back to ground.

Operation of the circuitry of FIG. 3 will now be described. Assume the connections, as shown in FIG. 3, exist when no power is applied to the circuit via the main-chassis power supply. When main supply (Vcc) is turned on, power is applied to the timing input of timing mechanism 22, and the switch input of switching mechanism 24. Switching mechanism 24 may be a variable-type switch that closes incrementally, but is fully open at the moment power is applied (and thus no current passes through the switching mechanism). Timing mechanism 22, in combination with delay mechanism 23, forms a serial circuit which controls the activation of switching mechanism 24. Switching mechanism 24 is activated and may slowly close, so that power may be applied at a controlled and comparatively low rate to the remainder circuitry 25 on card 26. It is important to note that the main switching mechanism 24 itself may contain power control circuitry to provide (once activated) for ramped-up application of power to circuitry 25, as will be explained later.

Without the delayed switching mechanism of the present invention, power would be applied immediately, fully, and directly to card circuitry 25 upon turn-on. This may place an unreasonably heavy load on the power supply and produce a large inrush current, which causes the problems previously described. However, according to the present invention the timing mechanism 22 and delay mechanism 23 produce a delayed and controlled signal to switching mechanism 24, which prevents the immediate application of power to circuitry 25. The amount of delay and the speed at which switching mechanism 24 is closed may be based on a combination of both the timing and delay mechanisms operating in conjunction with one another, as well as a switching control operation.

In this embodiment, the timing mechanism 22 for each slot is located on the sub-chassis 21. It remains un-coupled from the delay mechanism 23 (on the card) until the circuit card 26 is fully inserted into the sub-chassis. Switching mechanism 24 will not allow any power application to the remaining circuitry 25 of the card until the timing and delay mechanisms have been joined, via circuit card insertion into sub-chassis backplane 21. If the circuit card 26 is inserted into an already inserted and powered sub-chassis backplane 21, the card circuitry 25 will be protected from sudden power surges. Likewise, if the electronic circuit card 26 is pre-inserted into sub-chassis backplane 21, and then sub-chassis backplane 21 is inserted into a fully powered main-chassis backplane 20, Vcc inrush current and power surges into card circuitry 25 are protected by the operation of the delayed switching mechanism as described above.

The timing mechanism 22 sets the amount of time which the delay mechanism 23 uses to produce a controlled operation of the switching mechanism 24. By way of example, which is not meant to be limiting, the timing mechanism may contain a time value, e.g., a number. Upon insertion of card 26 into the sub-chassis backplane 21, delay mechanism 23 will "read" the time value from timing mechanism 22. The delay mechanism may then begin to operate the switching mechanism, moving it from an open position to a fully closed position, based on the time value "read". In effect, the delay mechanism may use the time value to determine the amount of time required to change the switching mechanism from a fully open position to a fully closed position, thus controlling the application of power to the circuit card.

The timing mechanism may be a stored bit pattern in memory representing a numerical time value. The delay mechanism may be circuitry or a software program executing on a processor which "reads" the stored bit value as a time value from the timing mechanism, and then operates the switching mechanism from the open to fully closed position over the period of time represented by the stored bit pattern time value.

Other mechanisms which may store a time value in a timing mechanism are meant to be within the scope of the present invention. Likewise, various mechanisms are known which may "read" the time value and use this value to operate a switching mechanism.

The present invention is not limited to the configuration of the timing mechanism and delay mechanism as shown in FIG. 3. The placement of the timing mechanism and delay mechanism of the present invention may be reversed and the same overall result may be achieved. In such a configuration, the circuit card may contain the timing mechanism and the delay mechanism may be placed on the sub-chassis. The components may function in the manner described above with the same overall effect of controlling timed power activation to the circuit card in the slot, and then controlling a main switching mechanism for controlled application of power to the card remainder circuitry 25.

Figure 1A:
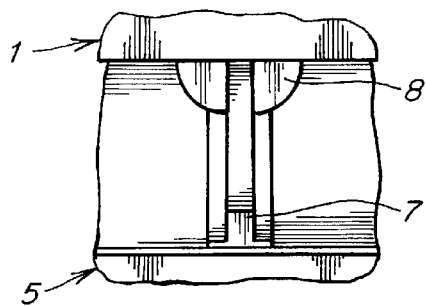
FIG. 1A is an enlarged fragmentary detail view of the area encircled by Arrows 1A—1A of FIG. 1.
Figure 1:
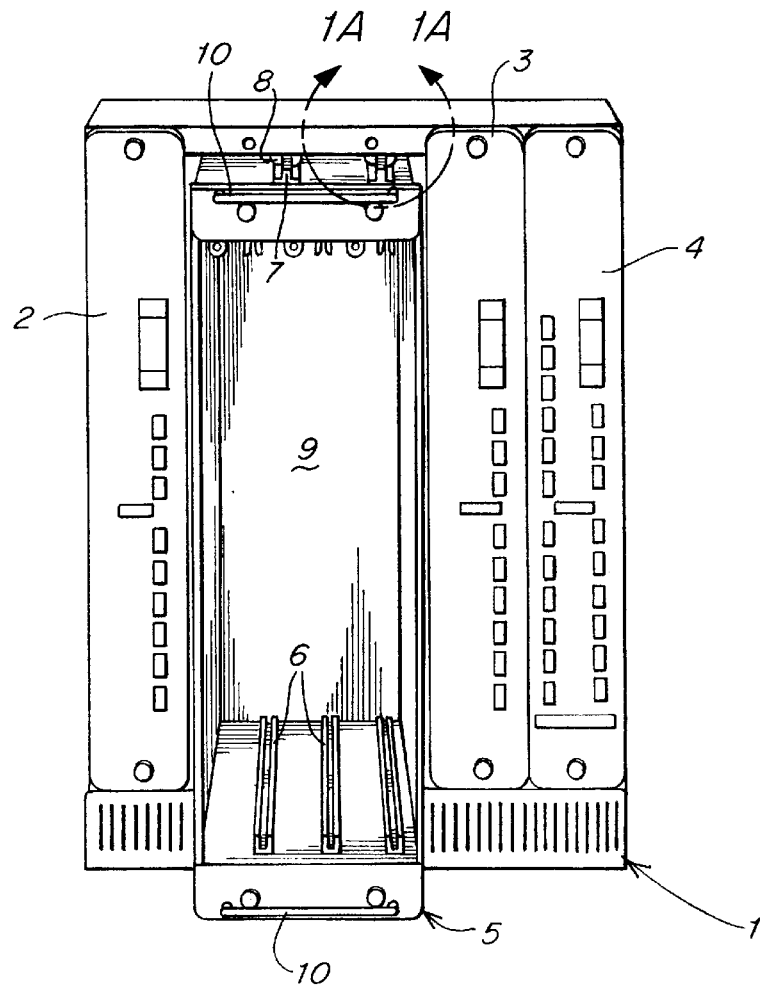
FIG. 1 is a prior art mechanical diagram showing how a sub-chassis and electronic circuit cards may be installed in a main-chassis.
Figure 2A:
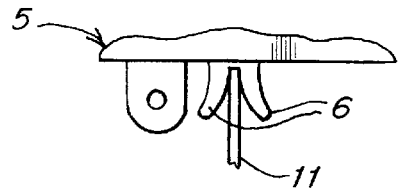
FIG. 2A is an enlarged fragmentary detail view of the area encircled by arrows 2A—2A of FIG. 2.
Figure 2:
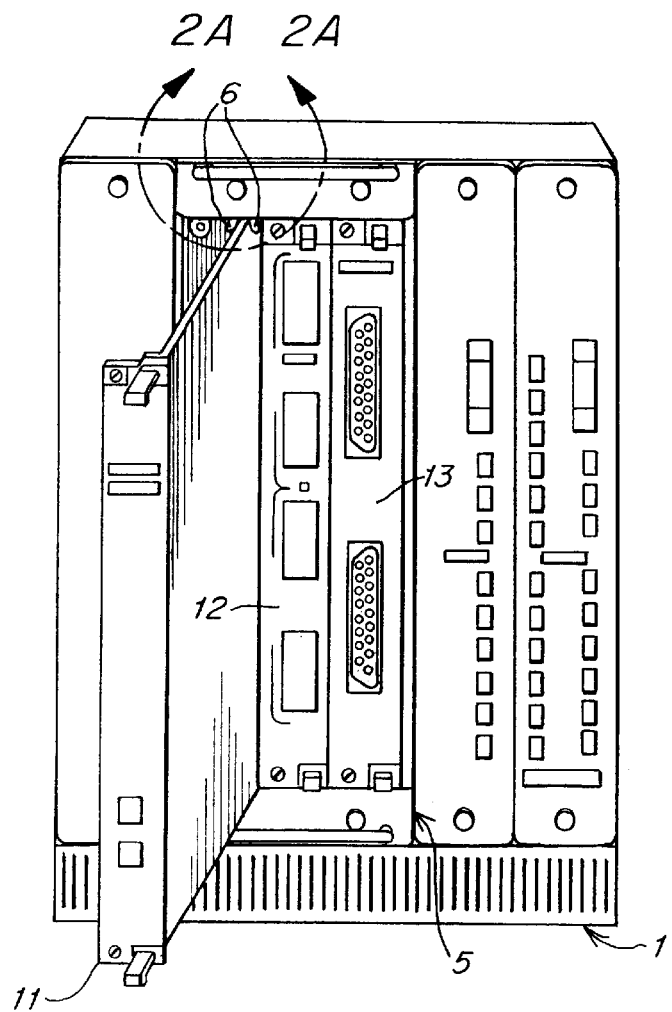
FIG. 2 is a prior art mechanical diagram showing how electronic circuit cards may be installed in a sub-chassis within a main-chassis.
Figure 4:
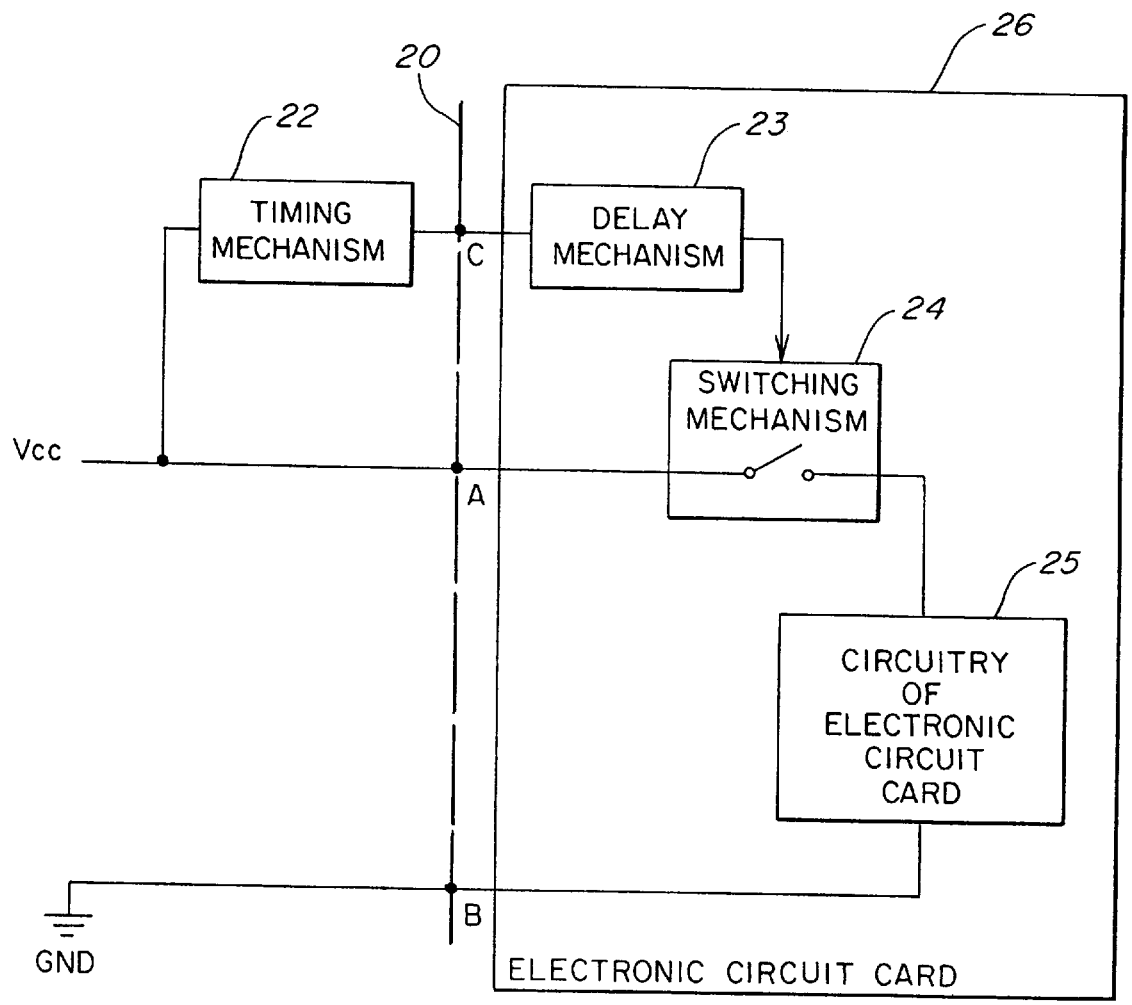
FIG. 4 is a schematic circuit diagram of a hotswap mechanism having a timing, delay and switching mechanism for use in an electronic circuit card and main-chassis configuration.

The previous embodiment describes a single circuit card which is inserted into a sub-chassis backplane. However, the present invention is not so limited. As shown in FIGS. 1 and 2, electronic circuit cards may be installed directly into the main-chassis, without a sub-chassis. In this embodiment, shown in FIG. 4, the main-chassis backplane contains the timing mechanism 22. Other portions of the circuit are the same as in the previous embodiment. Essentially, when card 26 is inserted into main chassis backplane 20 and power is applied, the timing mechanism 22 on the main-chassis backplane 20 couples to, and operates in conjunction with, the delay and switching mechanisms 23–24 on the electronic circuit card 26, to limit the inrush current. This protects the power supply, circuitry 25, and any other functioning circuitry which may be using the same power source from damage due to loss or reduction of power.

Figure 5:
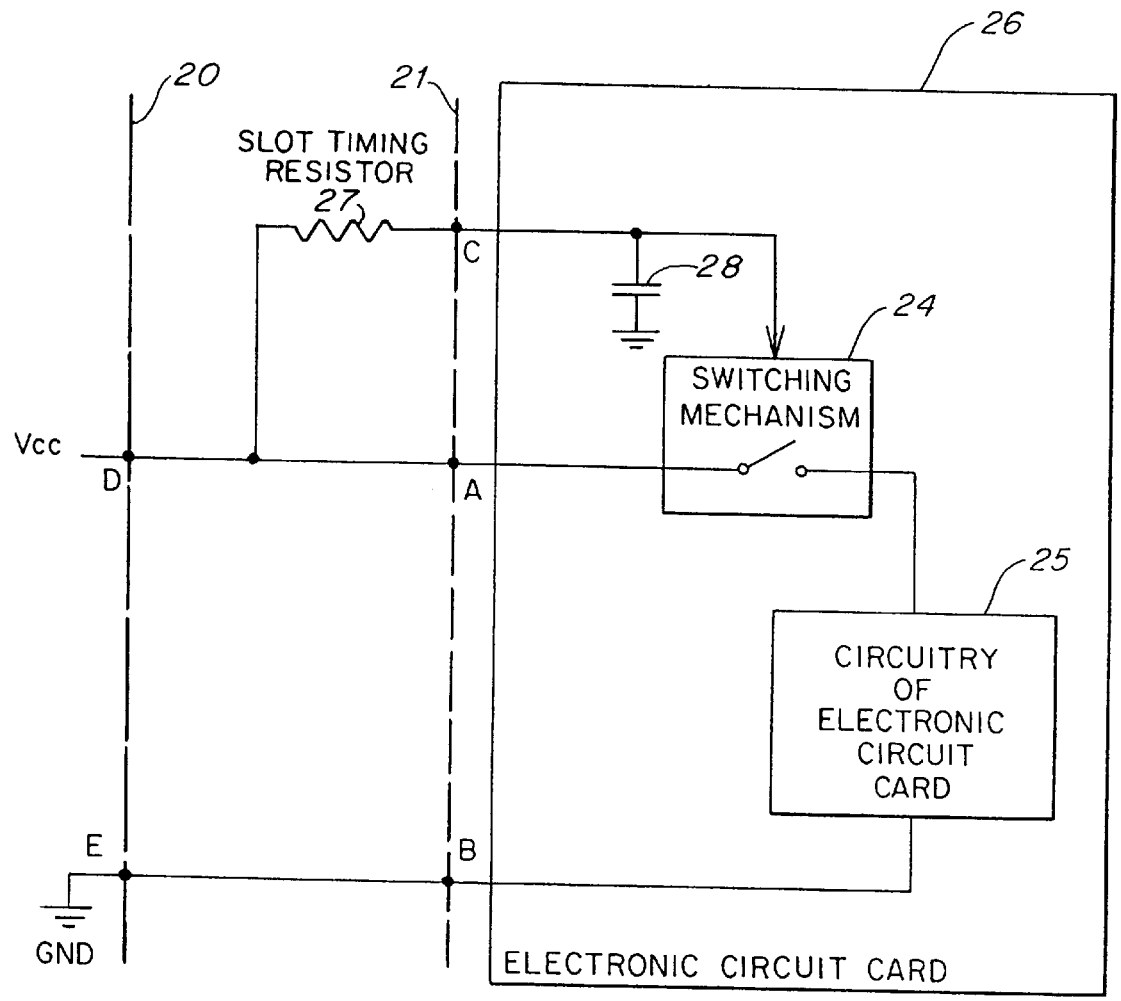
FIG. 5 is a schematic circuit diagram of a hotswap mechanism having a resistor-capacitor RC circuit and a switching mechanism for use in an electronic circuit card, sub-chassis and main-chassis configuration.

Another embodiment is shown in FIG. 5; a description of those portions of the circuit which have been described in previous embodiments will be omitted. In this embodiment, the timing mechanism is implemented with a slot timing resistor 27 located on the backplane 21 of the sub-chassis. The delay mechanism on the electronic circuit card is implemented with a capacitor 28 connected between the output of the slot timing resistor 27 and ground. The slot timing resistor 27 on the sub-chassis, in combination with capacitor 28 located on the circuit card (when inserted into the sub-chassis), provides a slot timing RC circuit which controls the switching mechanism 24, which in turn controls the ramped-up application of power (Vcc) to circuitry 25.

Operation of the FIG. 5 embodiment will now be described. Upon insertion of circuit card 26 and unpowered sub-chassis 21 into powered main-chassis 20 (or upon insertion of circuit card 26 into powered sub-chassis 21), the slot timing resistor 27 and capacitor 28 form a slot timing RC circuit. As the voltage across the slot timing RC circuit increases, the output of the RC circuit activates the switching mechanism 24. The point at which the slot timing RC circuit allows the switching mechanism to operate determines the slot timing for application of power to the circuit card. After this point, the switching mechanism 24 begins to close, allowing power to ramp up in a controlled manner for circuit card 26. The Vcc supply voltage applied from main-chassis backplane 20, through connection point A, ramps up to full voltage through the switching mechanism 24. The switching mechanism may be comprised of FET's and other associated circuitry to allow precise and controlled application of power via an activation signal from the slot timing RC circuit. Those skilled in the art will appreciate that the present invention is not limited to such circuitry.

Figure 6:
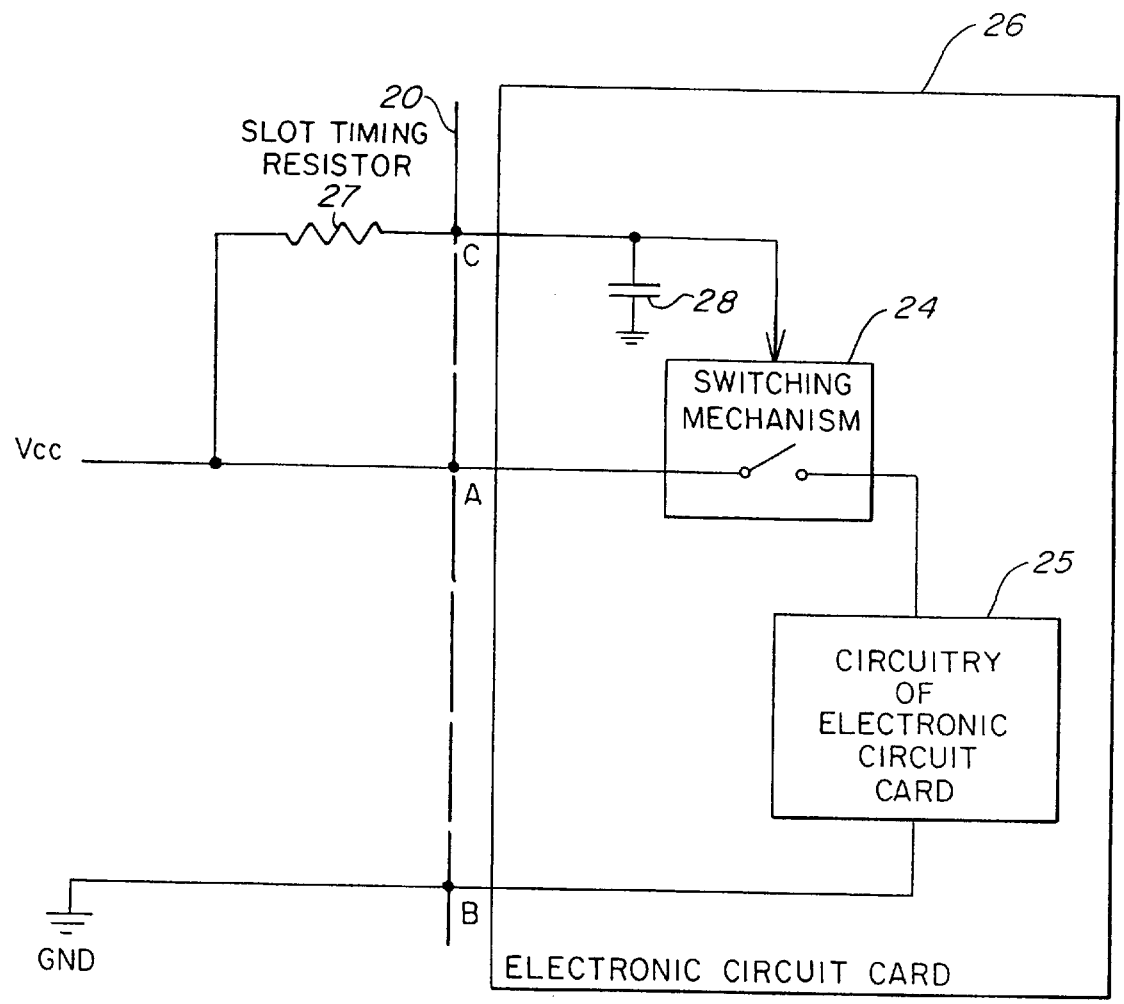
FIG. 6 is a schematic circuit diagram of a hotswap mechanism having a resistor-capacitor RC circuit and switching mechanism for use in an electronic circuit card and main-chassis configuration.

In a related embodiment shown in FIG. 6, the slot timing resistor 27 is mounted onto main-chassis backplane 20, and card 26 directly interfaces with the main chassis backplane. The electrical coupling is similar to the embodiment of FIG. 4; however a slot timing RC circuit similar to that of FIG. 5 is used. The circuit commences operation when circuit card 26 is inserted into the powered main-chassis, instead of the sub-chassis.

Figure 7:
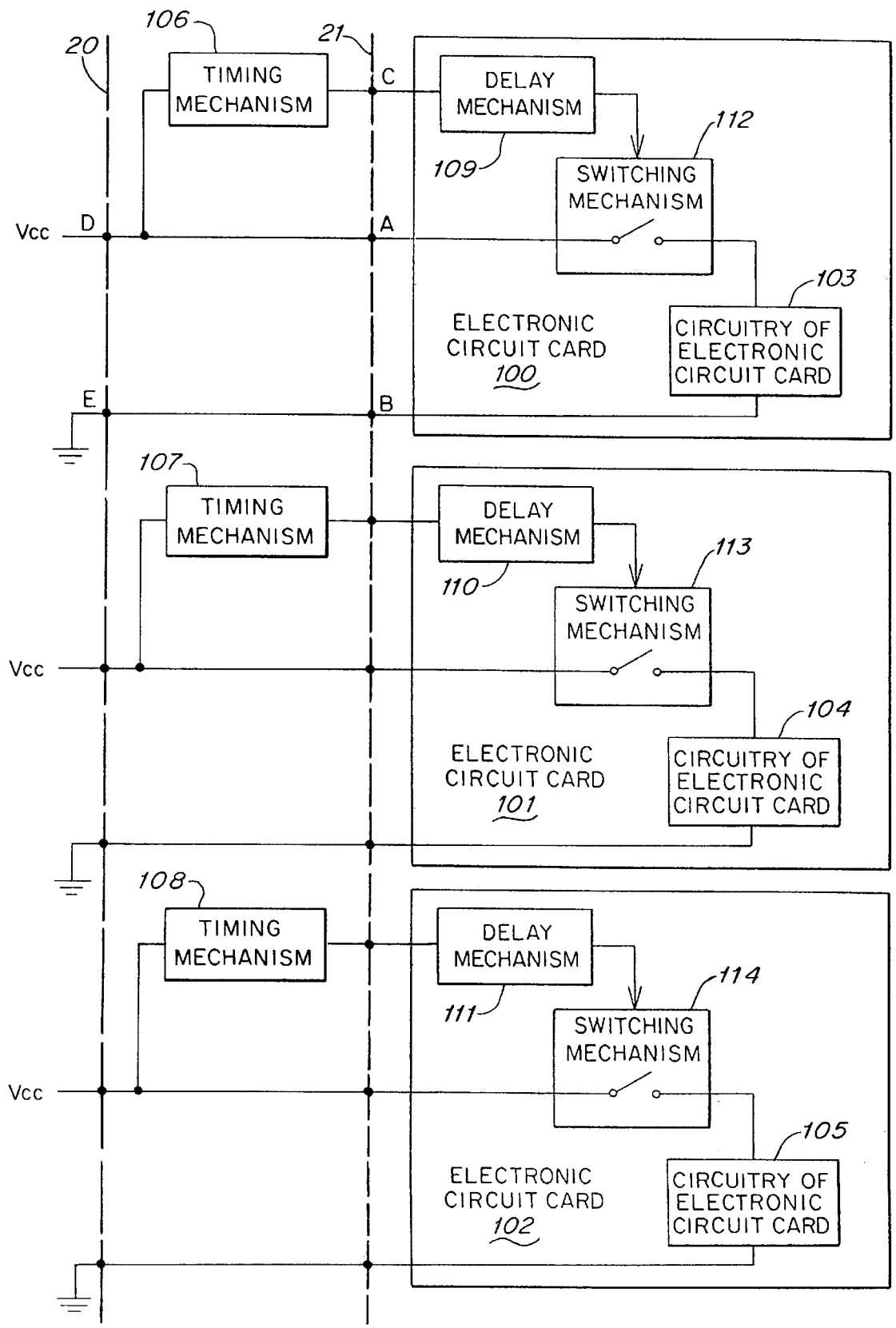
FIG. 7 is a schematic illustration of multiple hotswap mechanisms having timing, delay and switching mechanisms for multiple electronic circuit cards in a sub-chassis and main-chassis configuration.

A next embodiment further extends the above concepts. In this embodiment, a sub-chassis has multiple slots populated with multiple electronic circuit cards, as shown in FIG. 7. Timing mechanisms 106–108 are attached to sub-chassis backplane 21. Mounted on each card 100–102 is a delay mechanism 109–111. When one of the cards 100–102 is inserted into a slot and electrically coupled to the sub-chassis backplane 21, an electrical connection is made between the delay mechanism on that card and the associated timing mechanism for that slot. Thus, the delay mechanisms 109–111 on each card, in conjunction with the associated slot timing mechanisms 106–108, control switching mechanisms 112–114 on each card, respectively.

When the sub-chassis backplane 21 (loaded with cards 100–102) is inserted into main-chassis backplane 20, based on a relationship between the timing mechanisms 106–108 and the respective delay mechanisms 109–111, power application to each individual card circuitry 103–105 is staggered. This means that each card's circuitry 103–105 receives full power application (Vcc) at a different time. This staggering effect is achieved because each of the timing mechanisms 106–108 on the sub-chassis backplane 21 contains a different time value. This limits at any one time the load placed on the power supply.

As an example, the value of time mechanism 106 may be shorter than the value of time mechanism 107, which may in turn be shorter than the value of time mechanism 108. When the sub-chassis is inserted into either an unpowered main-chassis which is later powered, or an already powered main chassis, each timing mechanism/delay mechanism combination for each circuit card 100–102 begins to function sequentially. In this example, the circuitry 103 of card 100 will be first to receive power application (Vcc) because of the shorter time value contained in timing mechanism 106. This shorter time value causes the combination of timing mechanism 106 and delay mechanism 109 to close switching mechanism 112 first (before the switching mechanisms 113–114 on the other two cards 101–102). Subsequent to the full closing of switching mechanism 112, switching mechanism 113 may begin allowing power application to circuitry 104 on card 101. Finally, the longest time value of timing mechanism 108 activates switching mechanism 114, after the other switching mechanisms 112–113. In this manner, full power is applied at different times and in a controlled manner to the remaining circuitry 103–105 of cards 100–102.

Figure 8:
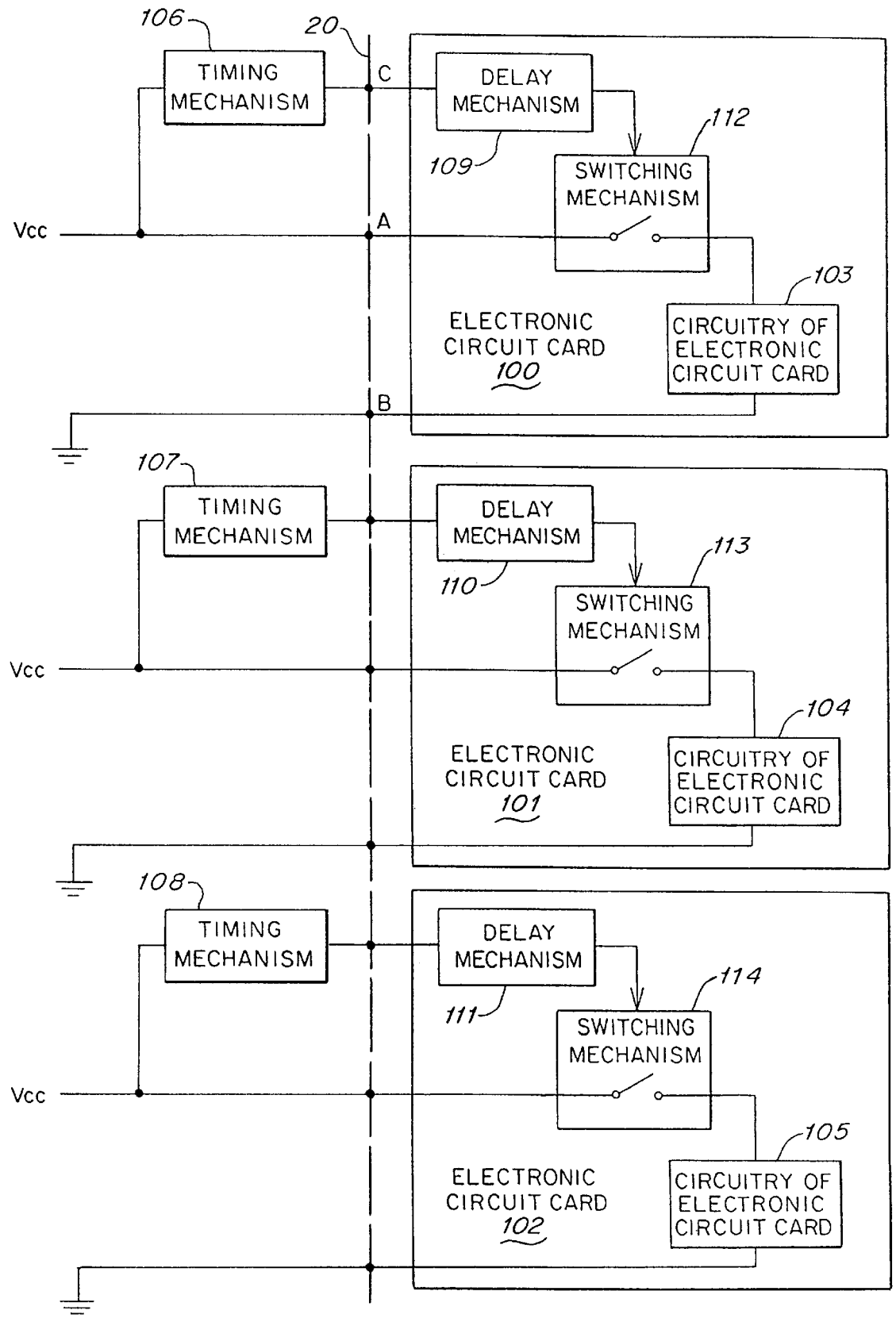
FIG. 8 is a schematic illustration of multiple hotswap mechanisms having timing, delay and switching mechanisms for multiple electronic circuit cards in a main-chassis configuration.

Another embodiment is shown in FIG. 8; descriptions of features which are the same as in previous embodiments will be omitted. In FIG. 8, each slot (not shown) on main chassis backplane 20 has its own associated timing mechanism 106–108. When electronic circuit cards 100–102 are inserted and electrically coupled directly into the main-chassis backplane 20, each delay mechanism 109–111 acts in conjunction with its respective slot timing mechanism 106–108 to control the application of power to card circuitry 103–105. The timing/delay circuit functions the same as in the previous embodiment, except that the circuit cards are inserted directly into the main-chassis (instead of a sub-chassis). Again, by varying the time values of timing mechanisms 106–108, power application may be staggered to the electronic circuit cards.

Figure 9:
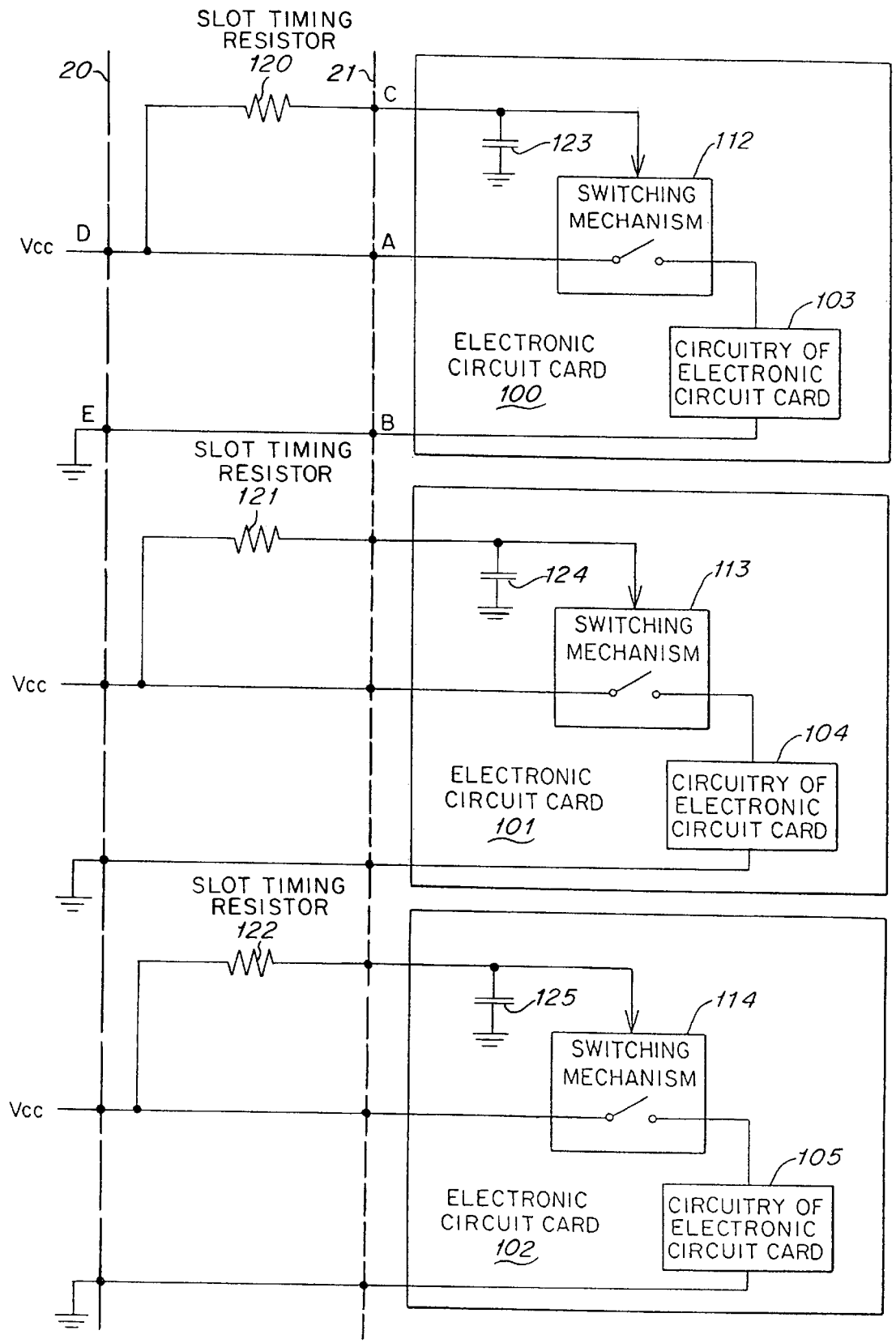
FIG. 9 is a schematic illustration of multiple hotswap mechanisms having resistor-capacitor RC circuits and switching mechanisms for multiple electronic circuit cards in a sub-chassis and main-chassis configuration.

FIG. 9 is similar to FIG. 7, but utilizes slot timing resistors 120–122 as the specific timing mechanisms for each of the slots in the sub-chassis 21. The delay mechanisms on electronic circuit cards 100–102 are formed by capacitors 123–125, each connected to ground. As in the previous embodiment, a slot timing RC circuit formed at card insertion time enables a time-delayed application of power to the card circuitry.

In this embodiment, each slot timing resistor 120–122 has a different resistance value. Having a distinct resistor value associated with each slot allows for staggered power application to the circuitry of each card. When the RC voltage of each slot timing resistor/capacitor combination reaches its respective threshold value, an activation signal operates the respective switching mechanism 112–114 to begin ramping-up the power applied to the respective circuitry 103–105. Power is thus applied in a controlled manner to the circuit card for a particular slot, while other slots are either already powered up, or are building up the required threshold RC voltage. In this fashion, when a sub-chassis with multiple cards is inserted into a main chassis, each individual circuit card may be powered up at a different time, thus staggering the load and inrush current effect on the power supply of the main-chassis.

In a specific example, the RC circuits of FIG. 9 may be powered by a 5-volt power supply (Vcc) from the main-chassis. Each capacitor 123–125 may be a 10 uf capacitor. By using the same size capacitor on each circuit card 100–102 installed in sub-chassis 21, a predetermined timing scheme for application of power is maintained, regardless of which card is in which slot. When each capacitor value is the same, the slot system timing is based on the resistance values. This embodiment enables: (1) standardization of circuit card manufacture (i.e., all cards are the same) and (2) determination of the system timing by the chassis manufacturer (i.e., timing resistors on the chassis). This is an important benefit, since the power supply is usually located with the main-chassis, and thus the chassis manufacturer can set the timing values for use with a specific power supply. Also, by setting the timing values through resistors, which may have a smaller tolerance than capacitors, tighter control over system timing may be maintained, e.g., by use of 1%-tolerance resistors versus 10%-tolerance capacitor values.

A timing scheme for a four-slot chassis example is shown in Table 1 below:

TABLE 1

Example Slot Timing Including Component Tolerances

| Slot | Resistor Value | RC Time | Minimum[a] | Maximum[b] |
|------|----------------|---------|------------|------------|
| 1 | R-Value1 | ~0.5 sec | 0.44 sec | 0.56 sec |
| 2 | R-Value2 | ~1.5 sec | 1.33 sec | 1.67 sec |
| 3 | R-Value3 | ~2.5 sec | 2.22 sec | 2.78 sec |
| 4 | R-Value4 | ~3.5 sec | 3.10 sec | 3.89 sec |

[a]Minimum timing is derived from worst case component tolerances of −11%.
[b]Maximum timing is derived from worst case component tolerances of +11%.

Table 1 shows the beginning time of power application for each slot, based on a selected slot timing resistor value (R-Value1 thru R-Value4). The resistor values may be sized based on power-up requirements of the circuit cards, or on power supply limitations. Each resistor on the chassis forms an RC circuit with a 10 uf capacitor on a circuit card in the slot. The 10 uf capacitor is not meant to be limiting, but is used for illustrative purposes. Each slot RC circuit has an associated time constant designated as RC Time. The RC Times are approximate because the exact time interval between a power-up of the circuit card inserted in slot 1, and the next successive circuit card in the next slot, may be partially determined by the amount of time required to charge the bulk capacitance of the card in slot 1. In this example, the RC Time for a slot is the time for the voltage across the capacitor to reach 63% of the input voltage (5 V), namely, 3.15 V. This value is used because these RC circuits serve as inputs to Schmitt trigger gates, which have maximum positive thresholds at 3.5 V (VCC=5 V, Ta=25° C.). As all the circuit cards use the same device, with large timing margins, this timing scheme is adequate.

The columns in Table 1 labeled Minimum and Maximum provide the minimum and maximum startup times for these RC circuits, which vary due to component tolerances (here ±11%). These minimum and maximum ranges allow a slot timing scheme which has a worst case minimum of 0.32 seconds between each circuit card power up sequence before the next slot becomes active; this 0.32 seconds is the time between the maximum RC time for slot 3, and the minimum RC time for slot 4. Exact timing is not critical for sequencing the slots in this embodiment, and 0.32 seconds is more than adequate. One skilled in the art can determine an appropriate timing for a given system to insure that the application of loads is adequately staggered among the circuit cards.

In this example, the circuit card in slot 1 switches on power no later than 0.56 seconds from initial power-up time. Slot 2 has power switched on after no more than 1.67 seconds. Slot 3 has power switched on no later than 2.78 seconds, and finally, slot 4 obtains power no later than 3.89 seconds after power-up.

The slot timing resistor in slot 1 may be used to provide a delay from initial power-up, before power is applied to circuitry of the card in slot 1. This delay allows the main-chassis power supply to power itself up, prior to circuit card power application. For example, if a sub-chassis with many cards was inserted into an unpowered main-chassis, the main-chassis power supply would be given a chance to raise its voltage potential, prior to power application to the various circuit cards. In another example, described later, no resistor is provided in slot 1.

With regards to the embodiments of FIGS. 7–9, it should be noted that the same hotswap circuit can be used in two configurations. In a first configuration, the cards fit into a sub-chassis which then fits into a main-chassis, designated main-chassis A. In a second configuration, the cards fit directly into the main chassis, designated main-chassis B. Main-chassis A and B may or may not be equivalent. For example, when a sub-chassis is used, extra space may be needed in the main-chassis (i.e., distance between the top and bottom guides) for the sub-chassis assembly. Alternatively, when only circuit cards are inserted in the main-chassis, the distance between the top and bottom card guides may be shorter. Since main-chassis construction is relatively simple, compared to circuit card construction, main-chassis of varying sizes are easily provided for. The same expensive circuit cards may be used in either sub-chassis/main-chassis configurations, without the need for separate versions of the same circuit card.

Figure 10:
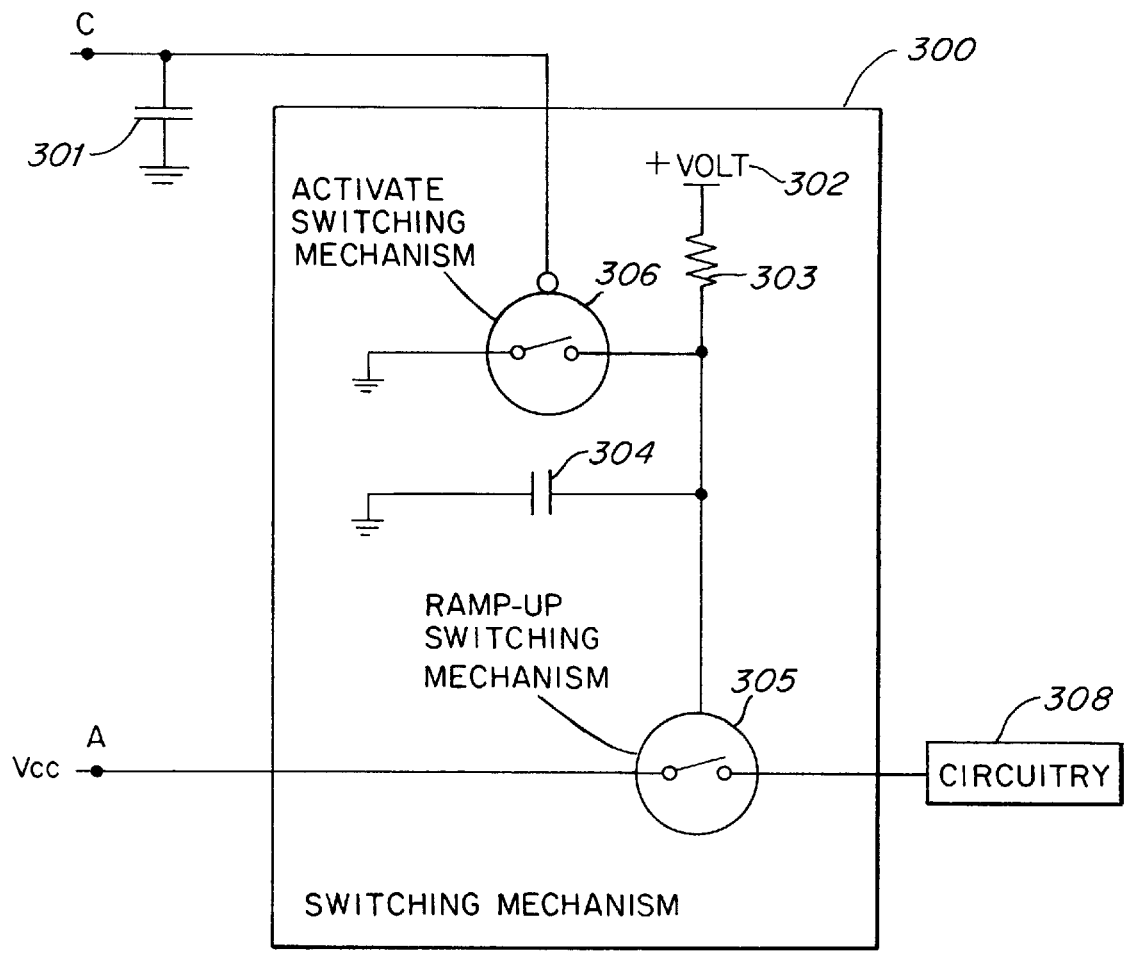
FIG. 10 is a schematic illustration of a switching mechanism.

FIG. 10 shows a switching mechanism in greater detail, which generally corresponds to switching mechanism 24 (FIGS. 3–6), or switching mechanisms 112–114 (FIGS. 7–9). FIG. 10 is not meant to limit the previous embodiments; other possible embodiments will be apparent to those skilled in the art.

In FIG. 10, a main switching mechanism 300 accepts power (Vcc) from power connection point A and outputs power to the card's remaining circuitry 308. Circuitry 308 generally corresponds to circuitry 25 of FIGS. 3–6 and circuitry 103–105 of FIGS. 7–9. Main switching mechanism 300 is controlled from connection point C, which also corresponds to the timing mechanism output in the previous embodiments. The delay mechanism 301 on the circuit card, in this example, capacitor 301, is also shown. Within the main switching mechanism 300 there are two switching mechanisms 305 and 306. Activate switching mechanism 306 is controlled by the input from connection point C (e.g., controlled by the combined timing and delay mechanisms) and has an activate output connected to ground. Activate switching mechanism 306 is active low, as shown by the circular node at its activate control terminal, and is thus in a closed state with no power in the circuit before the slot timing RC circuit is activated. A voltage supply output 302 connects to resistor 303. The output of resistor 303 connects to the activate input of activate switching mechanism 306. The output of resistor 303 also serves as a control to ramp-up switching mechanism 305, and also connects to capacitor 304 which in turn connects to ground. Resistor 303 and capacitor 304 form a power control RC circuit between the voltage supply output 302 and the control of ramp-up switching mechanism 305. Ramp-up switching mechanism 305 controls the ramp-up of power to the circuit card from connection point A to circuitry 308.

Upon insertion of a circuit card into a slot of the chassis, and upon power application, the timing mechanism of the slot (not shown in FIG. 10) and the delay mechanism 301 on the circuit card form the slot timing RC circuit discussed in the previous embodiments. In this example, a slot timing RC circuit is formed which controls activate switching mechanism 306. Before the slot timing RC circuit triggers and during a power-off state, activate switching mechanism 306, which is an active low switch, is closed, allowing any power from the voltage supply 302 to pass through activate switching mechanism 306 to ground. Activate switching mechanism 306 also disables the ramp-up control of ramp-up switching mechanism 305. Thus, ramp-up switching mechanism 305 is in an open state before the slot timing RC circuit time expires (and before complete insertion), thus allowing no power to pass. After the slot timing RC circuit has been charged, it activates and opens activate switch 306, cutting off the ground connection. This begins the activation of the power control RC timing circuit formed by resistor 303 and capacitor 304, which provides the control of the ramp-up switching mechanism. Upon activation of the power control RC timing circuit, mechanism 305 begins to close and lets current flow. In this manner, power is applied in a timed, controlled, ramped-up fashion from connection point A to the card's remaining circuitry 308.

By use of the main switching mechanism 300 described above, each circuit card has two separate power control timing circuits. The first power control timing circuit is the slot timing circuit formed upon insertion of the circuit card into a slot. This controls the slot timing, such as in a chassis with multiple slots. After the slot timing circuit is charged, the second power control timing circuit, local to the circuit card, controls power ramp-up, i.e., how quickly power actually is applied to circuitry 308, based on the timing delay of the second power control RC circuit.

The second power control RC timing circuit formed by resistor 303 and capacitor 304 in FIG. 10 may be replaced by another suitable control mechanism, without deviating from the scope of the invention. Furthermore, switching mechanisms 305 and 306 may be various types of switches, such as FETs, transistors, relays, etc. Furthermore, the voltage at voltage supply 302 to control switching mechanism 305, may vary depending on the particular application.

Figure 11:
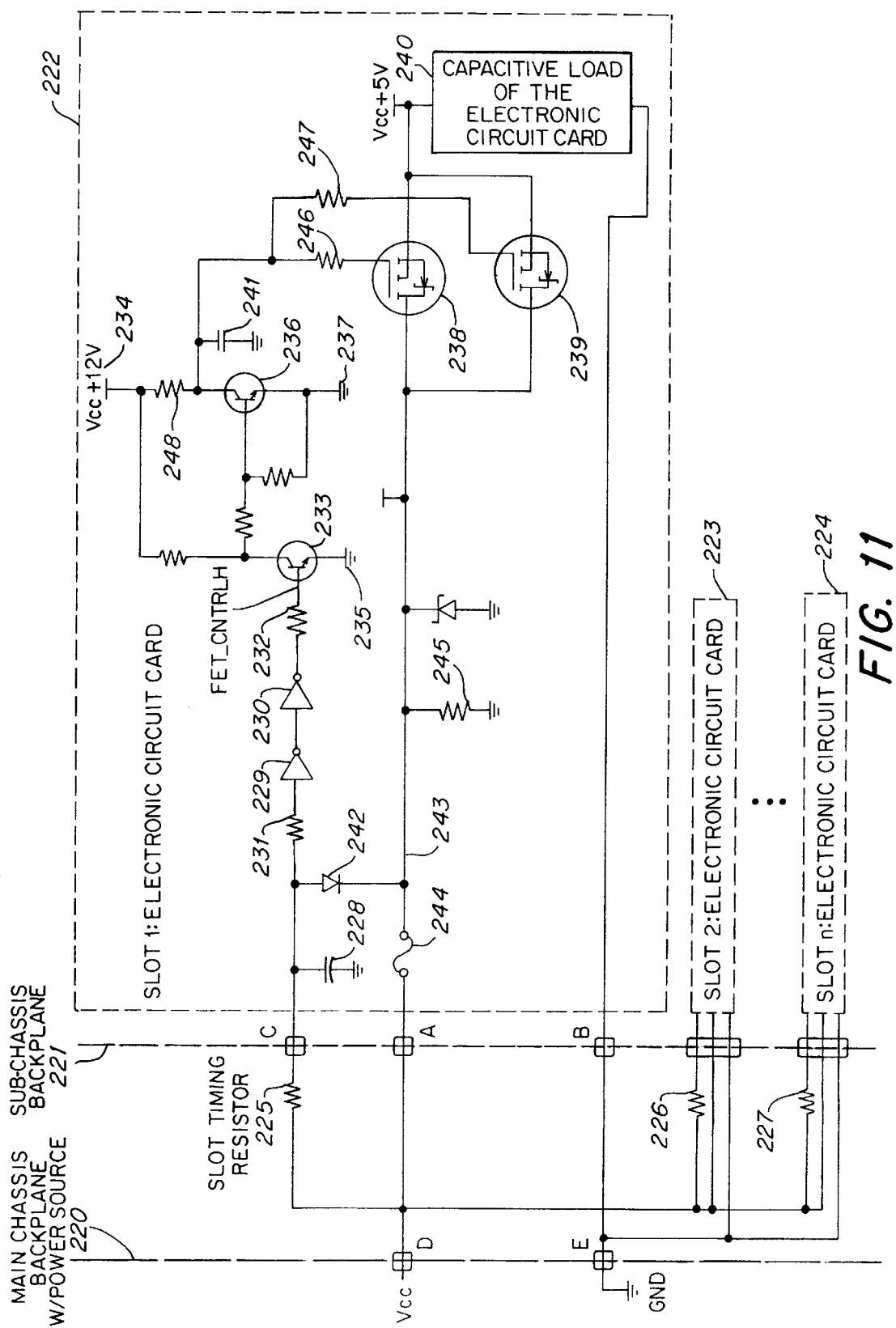
FIG. 11 is a detailed circuit schematic of a hotswap circuit for multiple electronic circuit cards in a sub-chassis and main-chassis configuration.

A specific embodiment of the present invention is shown in FIG. 11. Electronic circuit cards 222–224 are inserted and electrically coupled to power (Vcc) and ground (GND) on sub-chassis backplane 221 at connection points A, B and C. Sub-chassis backplane 221 is inserted and electrically coupled to power (Vcc) and ground (GND) on the main-chassis backplane 220 at connection points D and E. A slot in this embodiment corresponds to the circuit card connection points A–C on the sub-chassis. Slot timing resistors 225–227 are mounted onto the sub-chassis backplane 221. The slot timing resistors serve the function of the timing mechanism as explained in previous embodiments.

In FIG. 11, the detailed circuitry on circuit card 222 is shown for brevity; it may be assumed that similar circuitry exists on circuit cards 223 and 224. On circuit card 222, capacitor 228 and other associated circuitry, as will be described, may serve the function of the delay mechanism, as described in previous embodiments. The slot system timing for each circuit card 222–224 is controlled by the slot timing RC circuit formed by the sub-chassis backplane resistors 225–227 and the circuit card capacitors 228. Capacitor 228 is a 10 uf capacitor, one of which exists on each circuit card 222–224. Thus, varying the resistance values of the timing resistors 225–227 provides a way to stagger the power application to the various circuit cards 222–224 within the sub-chassis 221. This also allows the power application circuitry located on the circuit cards, to be the same on each card, and thus does not limit in which slot a card can be inserted.

In FIG. 11, a first power control RC circuit formed by slot timing resistor 225 and capacitor 228 connects to an inverter circuit comprising resistor 231, two inverters 229 and 230, and resistor 232. The output of the inverter circuit connects to the gate of transistor 233. The transistor 233 serves as a signal switch receiving the signal from the first RC circuit. The inverter circuit has Schmitt trigger inputs, such that once the RC voltage reaches a positive threshold, a control signal FET_CNTRLH is generated. When no power is present in the circuit card, the output of the inverter circuit is low at the base of transistor 233 which allows voltage from a 12 volt supply (not shown) connected at terminal 234 to turn on transistor 236. Transistor 236 serves as a grounding switch, in that the base of transistor 236 is high before FET_CNTRLH is active and the 12 volt signal from terminal 234 is pulled close to ground at ground terminal 237 through transistor 236. Thus, transistor 233 in conjunction with transistor 236 serve as an activate switching mechanism for power application in the circuit card 222. This keeps a second power control RC circuit, formed by resistor 248 and capacitor 241, inactive. The second power control RC circuit controls the ramp-up time for the FET's 238 and 239.

Main power Vcc to circuitry 240 is switched on by the two FETs 238 and 239. The FETs are controlled at their gates by the second power control RC circuit (resistor 248 and capacitor 241) which is switched on by the activate switching circuit formed by the transistors 233–236, which are in turn controlled by the first power control RC circuit (resistor 225 and capacitor 228). The 12 volt supply output terminal 234 connects to the gates labeled G of FET's 238 and 239, after passing through series resistors 246 and 247. The series resistors 246–247 prevent the two gates of the FETs from causing oscillations. The drains of each FET 238 and 239, labeled D, connect to voltage input line 243. The sources of the FETs both connect to an input of the remainder circuitry 240 of the circuit card. The FETs 238 and 239 are off when no power is present at their respective gates and thus the voltage supply to the circuitry 240 from connection point A is off.

However, upon application of power, the first power control RC circuit begins charging. While this is charging, but has not yet activated transistor 233, the 12 volt supply 234 is maintained at ground via transistor 236 which is on. Once the first power control RC circuit (resistor 225 and capacitor 228) activates transistor 233, the second power control RC circuit (resistor 248 and capacitor 241) begins to charge and controls the FETs 238 and 239. The FET's act as a power ramp-up switching mechanism. By choosing an appropriate sized resistor 248, the ramp-up time of the power control RC circuit, for power application to the circuitry 240, may be controlled.

This sub-chassis electronic circuit card hotswap circuit may be implemented using solid-state FET switches as shown (FETs 238 and 239). However, this is not meant to be limiting; those skilled in the art will realize other ways of switching the voltage input line 243 to the circuitry 240 via a timing and delay combination. For example, a relay may be used to perform the switching. FETs may provide a more desirable switching mechanism than a relay because the resistance of the mechanical contacts in a relay may not be guaranteed over the lifetime of the relay, and because relays require large drive circuits.

The FETs in this embodiment are n-channel FETs with a low effective resistance across the drain to source when fully enabled. In this embodiment, the resistance value is 0.010 ohms. Furthermore, in this embodiment we switch the power on the 5 volt voltage input line 243, which is the power supply side, rather than the ground side. Reasons for this include improved noise margins on the power supply side and the presence of a solid ground plane.

A difficulty of using n-channel FETs is achieving a gate level voltage at a sufficient level above the FET switch source voltage in order to maintain a low effective resistance across the drain to source when fully enabled. In this embodiment, a gate voltage of 12 volts is used to turn on the FETs. This provides a voltage from gate to source across each FET of approximately 7 volts; this is sufficient to get the resistance across the drain to source close to its minimum value.

In this embodiment, an n-channel FET was chosen over a p-channel device because the n-channel's resistance across the drain to source is an order of magnitude smaller than that of the p-channel. However, those skilled in the art will recognize that a p-channel device may be used in other embodiments.

In the present embodiment, the system application may have temperature, loading and gate drive requirements. For example, the present embodiment experiences resistance values across the drain to source of 0.012 to 0.014 ohms. By using two FETs 238–239 in parallel, the actual resistance across the drain to source may be as low as 0.006 to 0.007 ohms. In the present embodiment, with a worst case load of 8.7 amps, the voltage drop (Voltage=Current*Resistance) across the two FETs is 56 mV, which is within an acceptable range for most circuit tolerances. However, other FET types may be used, as those skilled in the art will recognize. Likewise, other switching and voltage control mechanisms having differing characteristics are within the scope of the present invention.

Returning to FIG. 11, at circuitry power up, or upon insertion of the circuit card 222 into a powered sub-chassis, or a sub-chassis containing circuit card 222 into a powered main-chassis during a hotswap operation, as the first RC circuit reaches its threshold voltage, FET_CNTRLH will power up in the low state and remain there until the timing capacitor 228 is charged. When the threshold voltage from the slot timing RC circuit is reached, FET_CNTRLH goes active or high. This turns off the transistor circuit formed by transistors 233 and 236, thus allowing the 12 volt signal to be diverted to the gates of the FET's 238–239. The transistor circuit will not enable the FET's until FET_CNTRLH goes high. Thus, FET_CNTRLH drives the transistor circuit, which converts the logic level TTL signal voltage, which drives the transistors to control the 12 volt gate drive signal of the FETs. If either the 12 volt or 5 volt signals are not present on the circuit card, which would indicate a failure condition, the circuit will not enable the power control FETs 238–239.

The 12 volt signal is slowly applied to the FETs due to the second power control RC circuit (resistor 248 and capacitor 241), which must charge up over time. Therefore, by changing the value of resistor 248, each circuit card 222–224 may control its own ramp-up timing based on unique capacitance characteristics required for the circuitry 240 of that card. Therefore, ramp-up time is not dependant on slot timing values. When the FETs 238–239 are enabled however, during the time each FET is turning on, the FETs behave like a resistor going from an open circuit state (when FETs are disabled) to a closed circuit state (when FETs are fully enabled). This "pseudo resistor" presents a very large resistance which is in series with the uncharged capacitance of the remainder of the circuitry 240. The "pseudo resistance" limits the short circuit characteristics of the circuit capacitance in circuitry 240, as the circuit capacitance in circuitry 240 is charging. The FETs 238–239 thus behave like a large resistive load which the power source on the main-chassis 220 can handle while the overall circuit capacitance is charging. The load on the power supply then moves to a negligible resistance once the circuitry 240 demands a steady current (after charging). By varying the turn-on time of the FETs for each circuit card, this embodiment offers a customized environment which may be programmed for different applications or environments. The trade-off is a fast ramp-up power time vs. limiting current turn-on time.

In the embodiment of FIG. 11, the output portion of the slot timing RC pair (resistor 225 on the sub-chassis and capacitor 228 on the circuit card) contains a diode 242 which is connected between the output of the RC circuit and the voltage input line 243 on the circuit card 222. The voltage input line 243 also contains a bleed resistor 245 running to a ground connection. Once power is removed from the circuit card 222, the diode 242 allows the capacitor 228 of the slot timing RC circuit to discharge through the bleed resistor 245, as the supply voltage to the circuit card decreases. It is important that the timing capacitor 228, which controls timing of power application to the circuit board as previously described, discharge as quickly as the bulk capacitance of the circuitry 240. Diode 242 insures this discharge capability.

During fast hotswap insertion and removal operations, fully discharging the capacitor 228 ensures that the main-chassis power supply will never have uncharged bulk capacitance quickly placed directly across the main-chassis power supply Vcc and ground connections. This is because the diode allows relatively rapid discharge of the capacitor 228. Without a discharge mechanism, it may be possible that the capacitor 228 will remain partially charged, and upon a fast re-insertion of the circuit card, the slot timing RC circuit may have a very short start-up time, and thus the FET's may begin a rapid draw on the main-chassis power supply via voltage input line 243. Note that voltage supply line 243 on the circuit card 222 is also fused with fuse 244 to prevent damage to circuitry on the circuit-card 222 in the event of a failure. Those skilled in the art will readily recognize that there are other ways to ensure that the capacitor 228 is fully and quickly discharged upon power removal.

Figure 12:
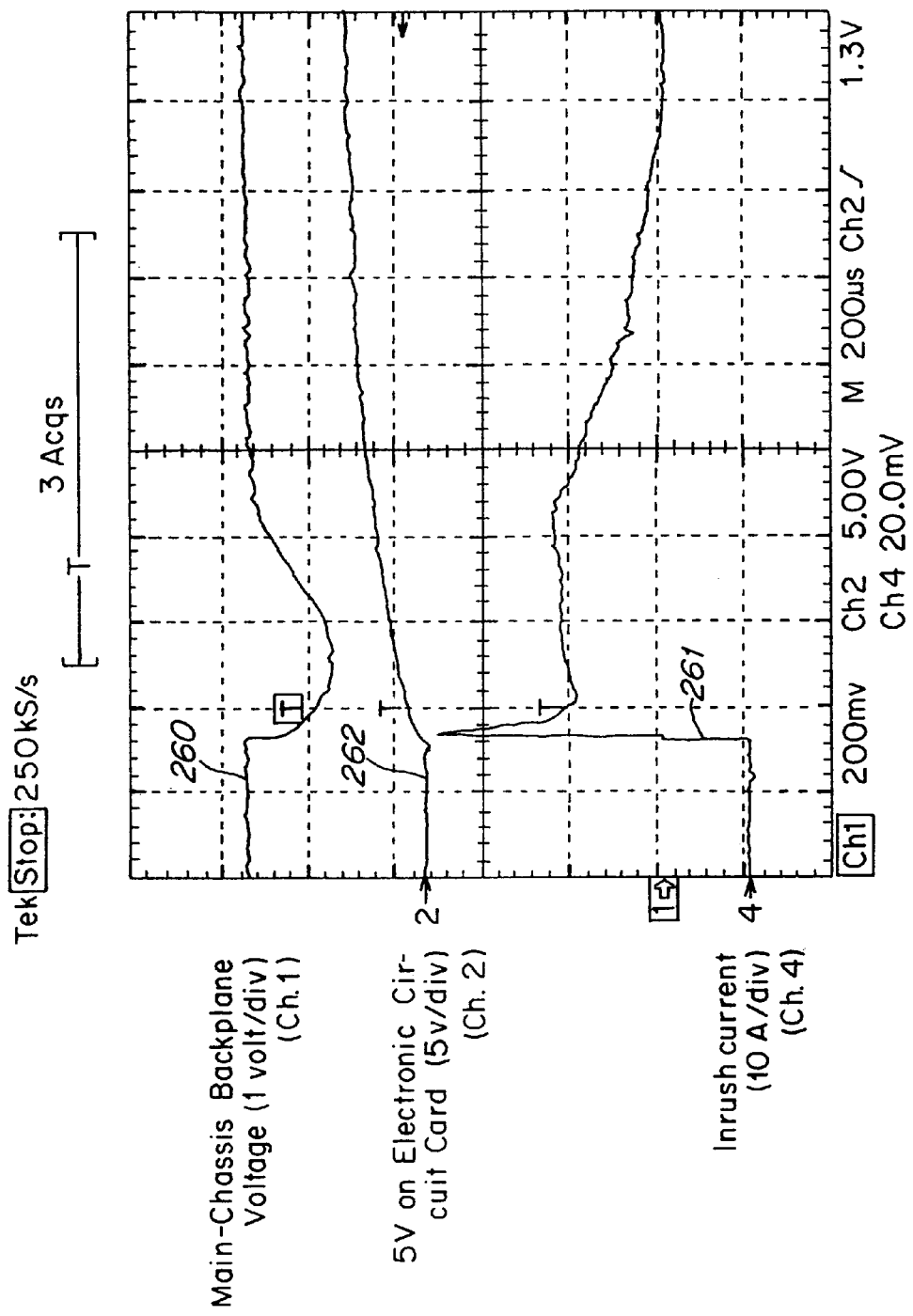
FIG. 12 is an actual waveform analysis showing hotswap insertion effects without the use of the present invention.

A description of actual power waveforms relating to the present embodiment will now be given to provide a more complete understanding of the present invention. The waveforms 260–262 of FIG. 12 illustrate the effects of hotswapping electronic circuit cards without the hotswap protection of the present invention. Ch. 1 waveform (260) is the main-chassis backplane voltage; it is measured with a differential probe, and has a scale of 1 volt per division. Ch. 4 waveform (261) is the inrush current, and is measured using a calibrated current probe. Ch. 2 waveform (262) measures the voltage of the circuit card. The inrush current and main-chassis backplane voltage surge and then droop as shown, as a result of hotswapping a circuit card with a resistive load and 5 mf of bulk circuitry capacitance. As seen in FIG. 12, the hotswap causes an inrush current of approximately 35 amps and a corresponding main-chassis backplane droop to 3.90 volts. The transient condition caused by the hotswap lasts about 400 usecs. The main-chassis backplane voltage droop is experienced by all of the electronics which receive power from the main chassis backplane. These problems are magnified when hotswapping a sub-chassis which is fully loaded with circuit cards.

Figure 13:
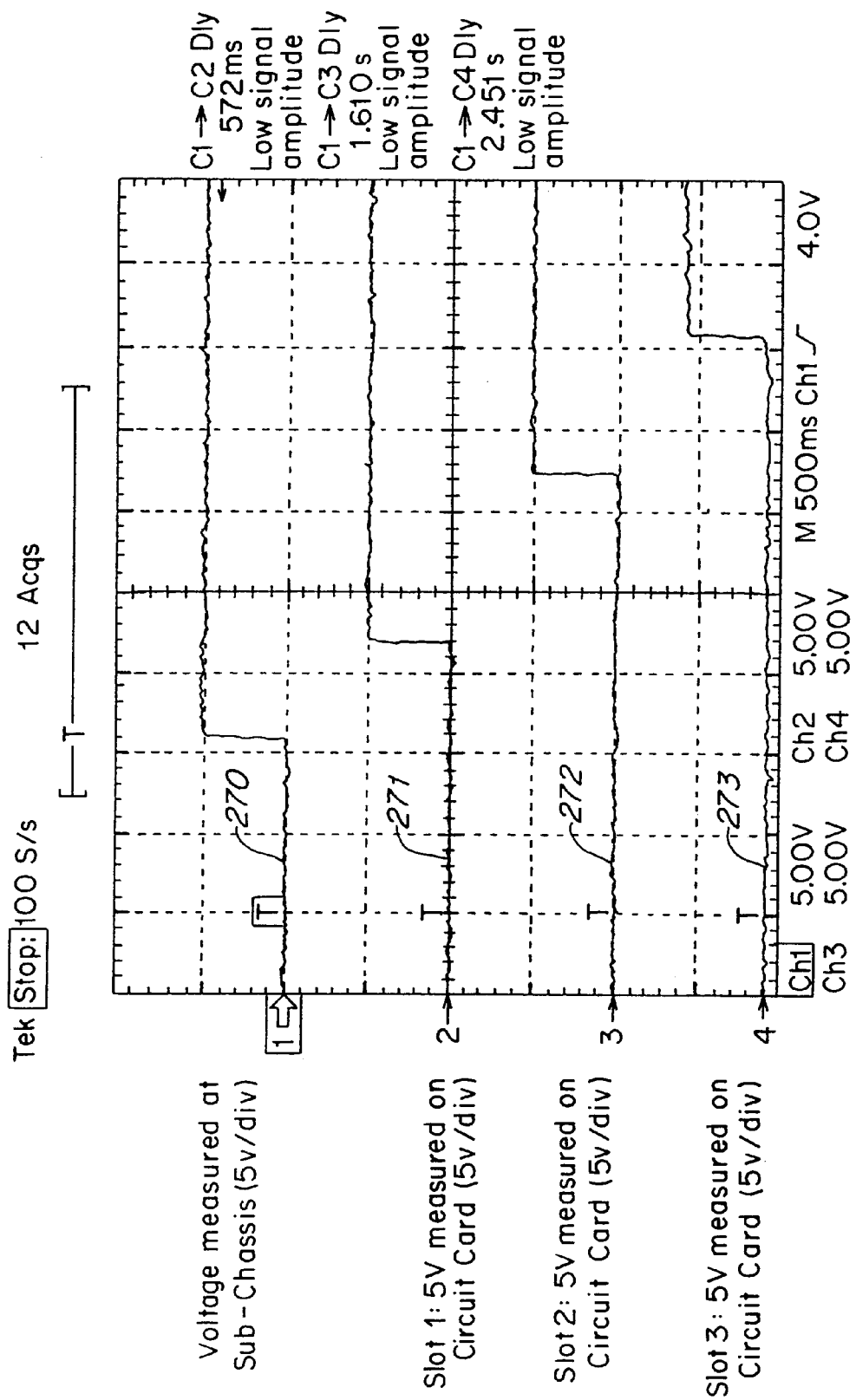
FIG. 13 is an actual waveform analysis showing delayed voltage application to circuit cards according to one embodiment of the present invention.

The waveforms 270–273 presented in FIG. 13 illustrate how the present invention delays application of power to each slot of a sub-chassis after power is applied to the sub-chassis during a hotswap operation. A top waveform (270) is the voltage measured at the sub-chassis. When this voltage goes high (upon power up from insertion), a delay is created (via the present invention) before power is applied to slot 1. In this example, the delay is 572 msecs before power is applied to slot 1; this is shown in the second waveform (271). Each successive slot 2–3 thereafter then gets power applied after the delay provided by the present invention (see waveforms 272–273). The respective delay times are shown on the right side of the graph, as time values elapsed from the time power was first applied to the sub-chassis.

The timing delay for each slot 1–N may be adjusted by changing the slot timing resistors on the sub-chassis. Thus, by sequentially delaying the application of power to each slot according to the present invention, the transitional capacitive load presented to the power supply is approximately: (total capacitance)/N, where N is the number of slots.

Figure 14:
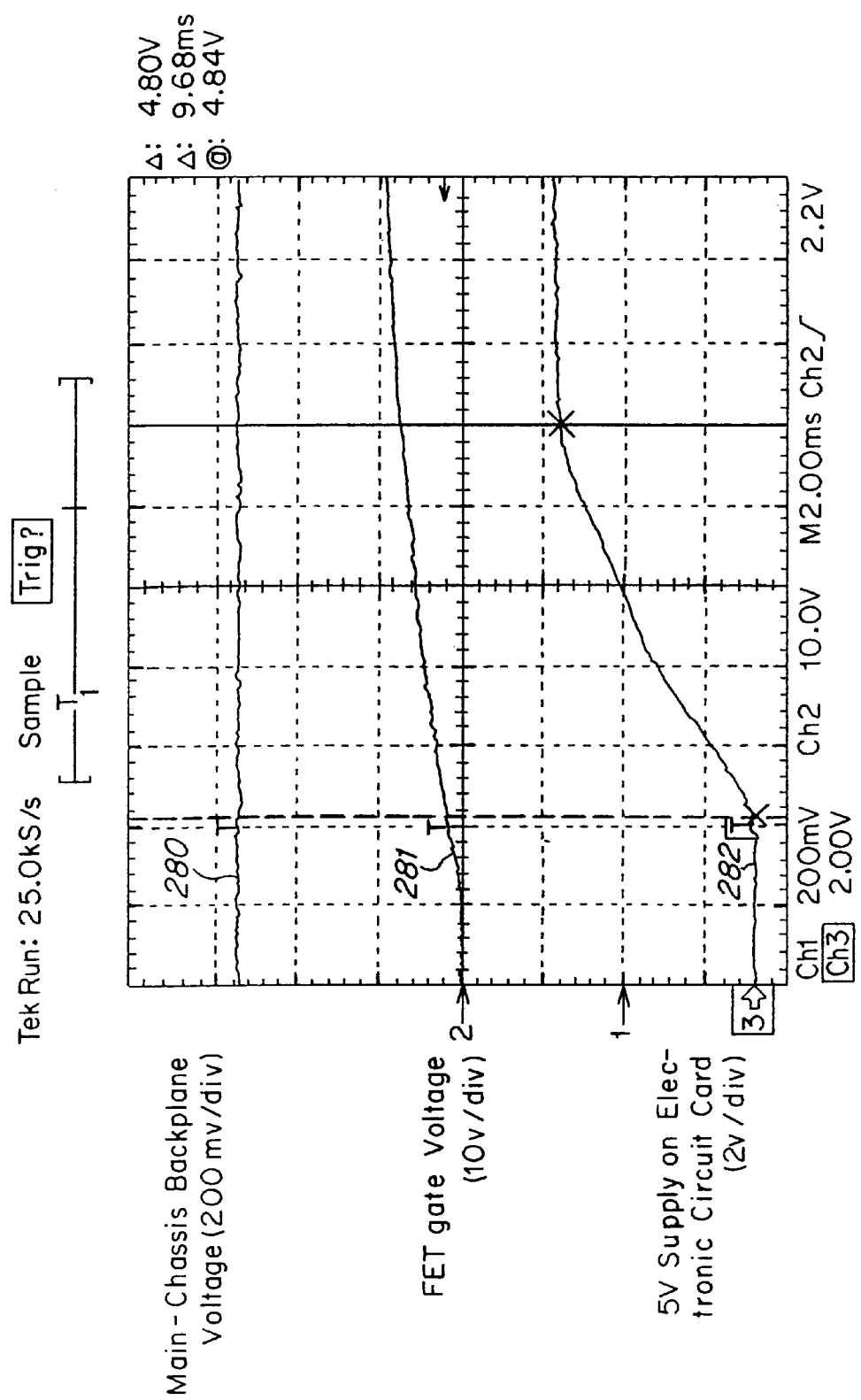
FIG. 14 is an actual waveform analysis showing the effects of one embodiment of the present invention on main-chassis, FET, and supply voltages.

FIG. 14 shows voltage waveforms 280–282 during FET turn-ons. The main-chassis backplane voltage is waveform 280, the FET gate voltage is waveform 281, and the 5 volt supply voltage of the circuit card is waveform 282. These waveforms show how the FET gate voltage is linearly increased from 0 to 12 volts when an electronic circuit card is inserted during a hotswap operation, or during power-up. The corresponding 5 volt supply voltage on the circuit card is directly related to the voltage drop across the drain to source of the FETs. When the FET gate voltage is very low, the majority of the voltage drop is across the FET. However, when the FET gate voltage rises to 12 volts, the voltage drop across the FET is negligible (less than 50 mV) and the 5 volt supply is at full voltage. The present invention, as shown by waveforms 280–282 in FIG. 14, allows the main-chassis voltage to remain unaffected via a controlled inrush current during a hotswap operation.

Figure 15:
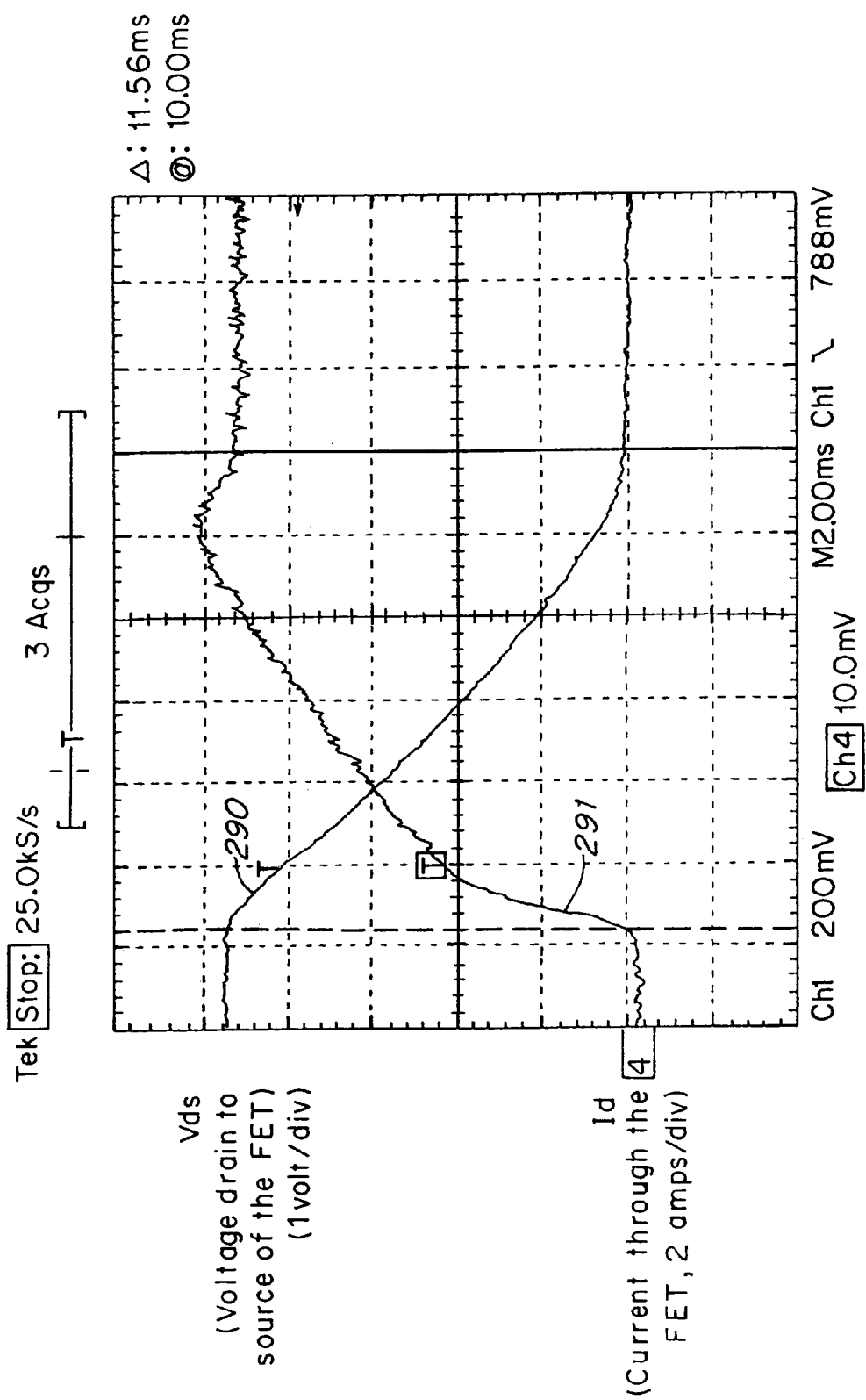
FIG. 15 is an actual waveform analysis showing the relation between voltage drain to source of an FET, versus current through the FET, according to one embodiment of the present invention.

FIG. 15 shows waveforms depicting the controlled inrush current during a hotswap insertion operation with the present invention. The first waveform 290, tracking from the upper left to the lower right, is the voltage of the drain to source of the FETs. This waveform 290 is somewhat the inverse of the 5 volt supply on the circuit card, shown by waveform 282 in FIG. 14. The other waveform 291 in FIG. 15 depicts the current through the FETs over time. By comparing FIG. 15 to FIG. 12, where the inrush is uncontrolled, it is seen that the present invention limits-inrush current to a transition which is within the response capabilities of the main-chassis power supply. The main-chassis voltage waveform is not shown in FIG. 15, but remains unaffected as shown in previous FIG. 14. Thus, the present invention effectively limits inrush current and surges relating to the main power supply.

Figure 16:
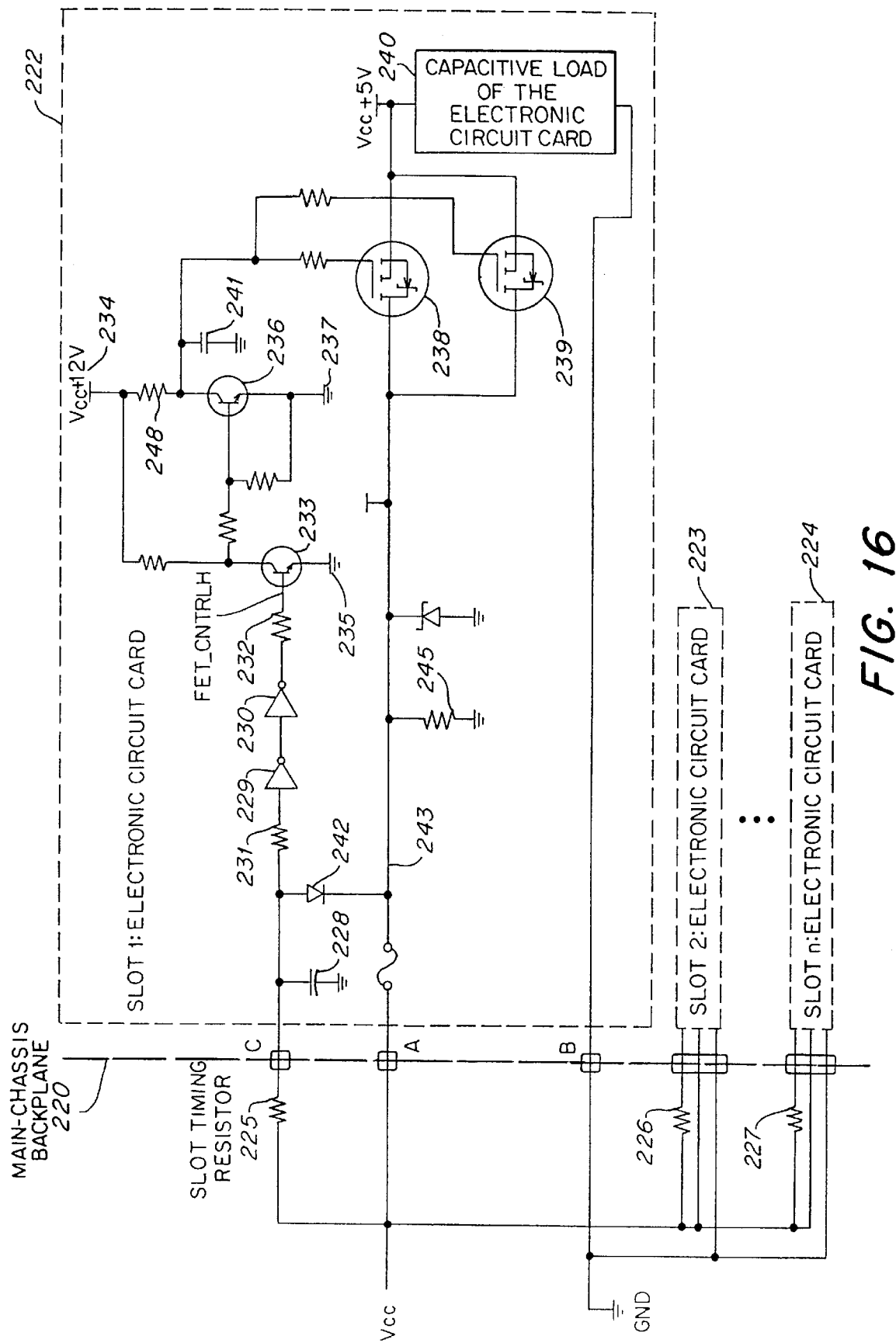
FIG. 16 is a detailed circuit schematic of a hotswap circuit for multiple electronic circuit cards in a main-chassis configuration.

FIG. 16 shows another embodiment similar to that shown in FIG. 11. The primary difference between these embodiments is that in FIG. 16, the circuit cards 222–224 are inserted directly into the main-chassis backplane 220. The main-chassis backplane 220 contains slot timing resistors 225–227. The circuitry of FIG. 16 generally functions in the manner as described in FIG. 11.

If slot timing is not desired in a main-chassis configuration, the embodiment of FIG. 16 may be useful. For example, in a dedicated application it may be known that a sub-chassis will never be used in the main-chassis. Furthermore, it may also be known that only one circuit card will be inserted into the main-chassis at a time, thus limiting the inrush requirements of the power supply. In such situations, the slot timing resistors for the main-chassis may be reduced to small values. Thus, the slot timing RC circuit formed via resistor 225 and capacitor 228 for each card 222–224 will have short delay times for the cards. These slot timing RC circuits will quickly trigger the second power control RC circuit (resistor 248 and capacitor 241), which can then control the ramp-up of power to circuitry 240. Thus, delay time for power application to each slot may be the same via equally small resistor values for resistors 225–227, yet each card may individually control ramp-up time for power application on-board the card for its own circuitry.

Figure 17:
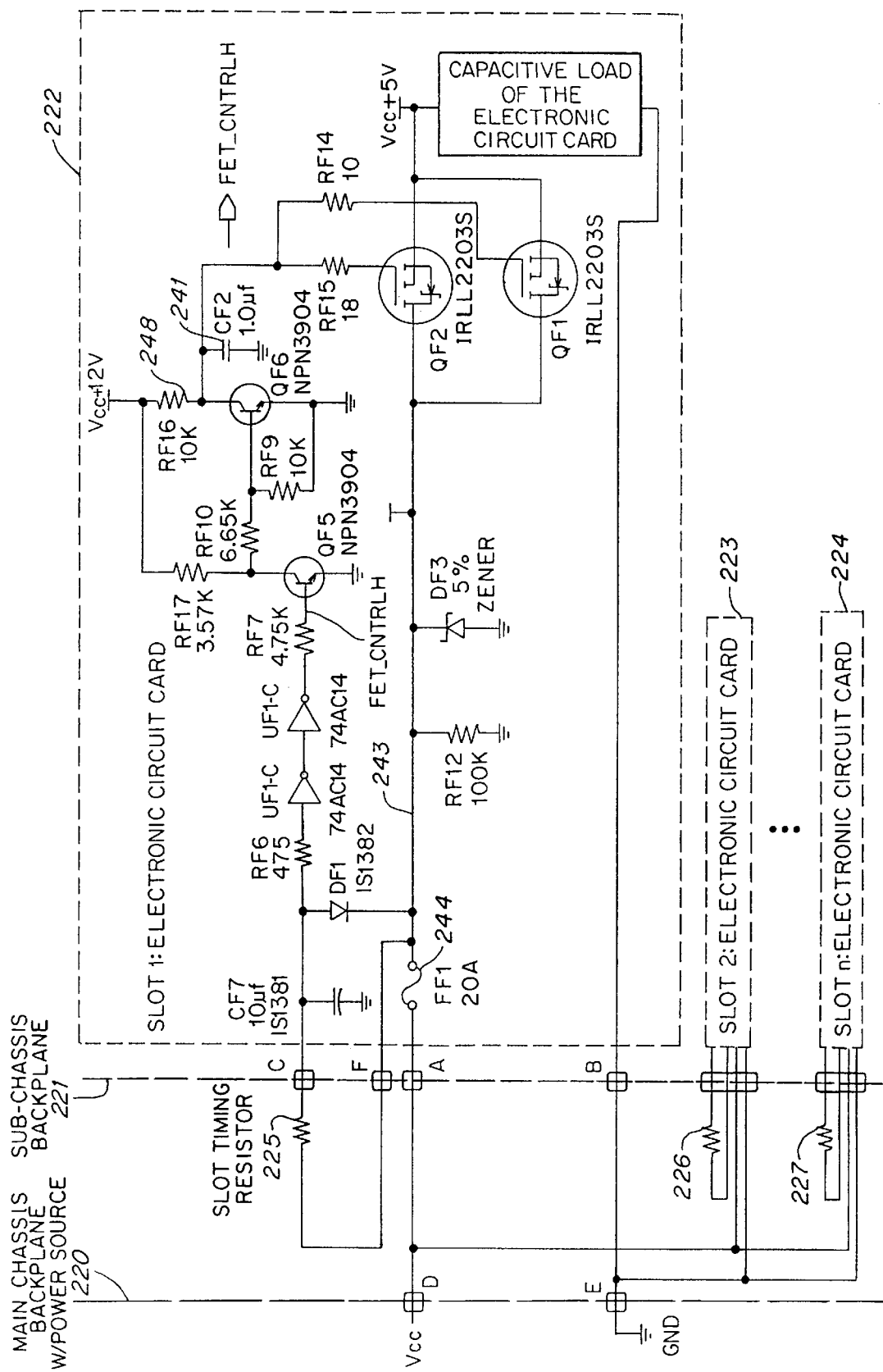
FIG. 17 is a detailed circuit schematic of a hotswap circuit using resistor loopbacks for multiple electronic circuit cards in a sub-chassis and main-chassis configuration.

FIG. 17 shows yet another embodiment of the present invention. A description of those features which are the same as in previous embodiments, will be omitted. Furthermore, in FIG. 17, instead of using successive numbers for the parts of the circuit which are the same as those of the embodiment of FIG. 11, the commercial electronic part numbers for the electrical components are shown instead. This serves to assist one skilled in the art to understand the circuits disclosed herein, without undue research of various component parts. The part numbers next to the circuit components in FIG. 17 are readily recognizable by those skilled in the art as standard circuit components available in commercial electronics markets.

The embodiment shown in FIG. 17 varies from the previous embodiment of FIG. 11, in that the inputs and outputs of the slot timing resistors 225–227 are connected between two connection points C and F on the sub-chassis backplane 221. The timing power output connection point F, on the circuit card 222 side of the connection (referred to as the timing power input connection of the chassis side), connects to a point on the voltage input line 243 just after the fuse 244. Using this connection point allows the slot timing RC circuit to be completely self sufficient upon power obtained from onboard the circuit cards. There are no extraneous power paths onto the circuit card other than the main Vcc feed at power connection point A. The power for the resistor of the slot timing RC circuit is obtained from the voltage input line 243. Each slot timing resistor still resides on the sub-chassis backplane. However, they now may be powered, after being fused by fuse 244, from the circuit card in the associated slot through connection point F.

During testing of the FIG. 11 embodiment it was found that if the fuse 244 were to blow, thus cutting off voltage input line 243 from the sub-chassis (or main-chassis), the power path passing through timing output connection point C provided a very small trickle of power that remained active. Although this is not a problem, the embodiment shown in FIG. 17 eliminates it. This is because the fuse 244 in FIG. 11 only cuts-off power connection point A upon overload, and timing output connection point C still remains connected to power via the timing mechanism input. In contrast, FIG. 17 provides a "loopback" slot timing resistor connection via connections C and F, to ensure that only power may be drawn from power connection point A onto the circuit card. Thus, the timing mechanism and delay mechanisms of the present invention may be activated only if the voltage input line 243 is not cut-off via fuse 244.

Figure 18:
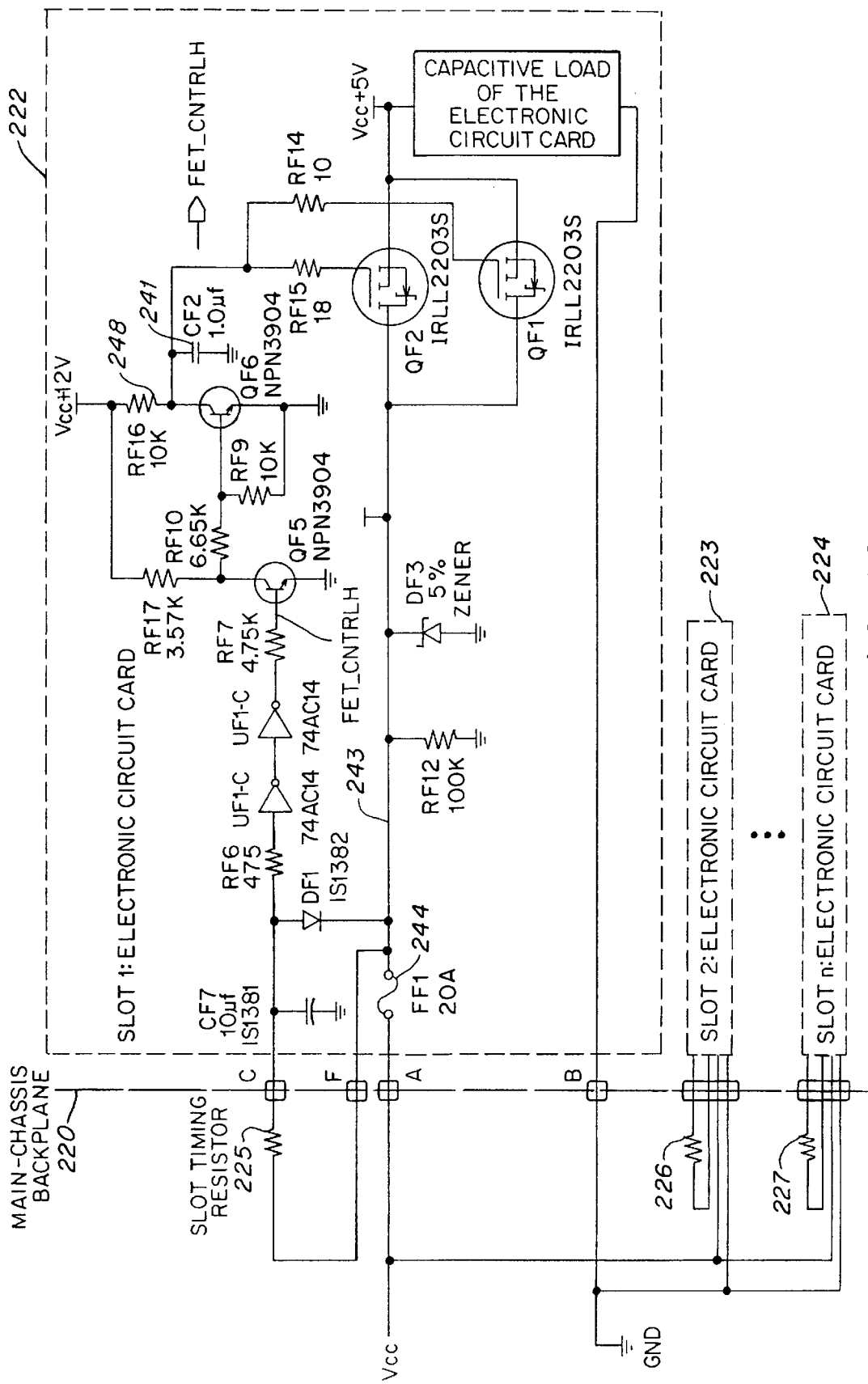
FIG. 18 is a detailed circuit schematic of a hotswap circuit using resistor loopbacks for multiple electronic circuit cards in a main-chassis configuration.

Yet another embodiment, similar to that shown in FIG. 17, is disclosed in FIG. 18. The primary difference between these embodiments is that in FIG. 18, the circuit cards 222–224 insert directly into the main-chassis backplane 220. The main-chassis backplane 220 contains slot timing resistors 225–227. The circuitry of FIG. 18 generally functions in the manner as described for the previous embodiment.

In another embodiment, the main-chassis power state may be already known and assumed to be powered on prior to sub-chassis insertion. Therefore, power application to the circuit card in slot 1 may be commenced immediately; the remaining slots, 2 thru N, may have the timing mechanism of the present invention used to stagger power application. Thus, in this embodiment, since the power supply is always already "up and running", the timing mechanism for slot 1 may not be needed. This would be beneficial in certain applications where start-up time for the circuit cards is needed to be minimal. By not requiring a timing mechanism for slot 1, time would be saved in the overall power-up sequence. To maintain the compatibility of slot 1 of the sub-chassis with all circuit card installations, a very small resistor which serves as a short timing mechanism may be used to allow for a very short time delay in slot 1. It may be desirable to implement the timing mechanism circuit for slot 1, since it may often be the case that a sub-chassis will be used with different main-chassis.

In previous embodiments, when circuit cards are inserted, it is often the case that many signal lines (not shown in Figures) are connected between the interfaces of the circuit card and either the main or sub-chassis. These signal lines may exist along with the connection lines discussed in relation to the previous embodiments. Data bus signal lines, for example, for transferring data to and from the circuit card may be present across the interface between the circuit card and chassis. It may be desirable, in the aforementioned embodiments, to buffer certain signal lines which go across the connection interfaces during the time of a hotswap operation. Signal buffers, such as ABT buffers, are devices used for buffering signal lines. Signal buffers often contain OE pins which operate as control signal pins to enable signal buffer drivers. The OE pins of the signal buffers, which buffer signal lines, may be biased during a hotswap operation. This biasing will place the signal lines in a disabled state during the hotswap operation. Disabling certain signal lines may assure that the device outputs of the circuit card or device being hotswapped are guaranteed to be tri-stated when the power is applied to the buffer power pins. By performing this operation, bus interference will be minimized during hotswaps, and devices being hotswapped will be prevented from attempting to drive the bus during a hotswap.

Likewise, upon insertion of a circuit card, for example, it may also be desirable to disable the signal buffering immediately upon card insertion. ABT buffers may be used in implementations of the present invention for the chassis (main or sub) backplane signal interface buffers. These ABT buffers allow signal level voltages on digital input and output interface pins to be applied before the application of power is applied, according to the present invention, to the overall circuitry of the electronic circuit cards being hotswapped into the chassis. ABT buffer integrated circuits can handle voltages at their inputs before application of power to the integrated ABT buffer devices themselves. Thus, insertion during a hotswap will not present a problem for signal lines using ABT buffers.

The ABT signal buffers may be important because they allow powering up of the signal interface, comprising many pins of a data bus for example, even when power to the slot is delayed according to the present invention. The signal interface may be totally separate from the power interface or it may be an integral part of this interface. Those skilled in the art will recognize that there are several other technologies which would also work to provided these aspects of the present invention, such as CMOS technologies. The ability to protect the signal interface may be an important design requirement when implementing embodiments of the present invention, and is provide herein for completeness.

Those skilled in the art will realize that the present invention provides a new and useful way to control power and signaling connection sequencing and timing between electrical components. Various modifications of the present invention will be contemplated by those skilled in the art without deviating from the scope of the present invention.

We claim:

1. A system for controlling application of power to a component, comprising:

a chassis having a chassis power connection and at least one slot, each slot having a slot interface;

at least one electronic component comprising a circuit card or a subchassis containing at least one circuit card, each component having a component interface for coupling with the slot interface, and a switch mechanism for controlling an application of power from the chassis power connection to circuitry on the component;

an associated timing mechanism for each slot/component pair located on one of the chassis and component;

an associated delay mechanism for each slot/component pair located on the other of the chassis and component;

wherein when the component interface and slot interface are coupled the associated timing mechanism and delay mechanism are coupled to provide a combined output to the switch mechanism for a controlled application of power from the chassis power connection to the component circuitry.

2. A chassis for providing a controlled application of power to electronic components, comprising:

a chassis having a chassis power connection and at least one slot having a slot interface for coupling within electronic components, the component comprising a circuit card or a subchassis containing at least one circuit card;

an associated timing mechanism located on the chassis for each slot, each timing mechanism having a different value, the timing mechanism having a timing input and a timing output, means for coupling the timing input to the chassis power connection, and means for coupling the timing output to a component interface.

3. The chassis of claim 2, wherein the slots are numbered from 1 to N, where N corresponds a number of the slots, and the resistance value increases with increasing slot number.

4. The chassis of claim 2, wherein:

the timing input includes means for interfacing with a circuit card containing a power connection that is indirectly coupled to the chassis power connection.

5. A circuit card including a power control circuit, comprising:

a card power connection, a card ground connection and a timing mechanism connection, each connection having a means for interfacing with a slot of the chassis;

a main switching mechanism having a switch input, a switch output, the switch input being connected to the card power connection;

a delay mechanism having a delay input and a delay output, the delay output being coupled to the switch control, the delay input being connected to a timing mechanism on a coupled chassis by the timing mechanism connection;

circuitry having a circuitry input coupled to the switch output and a circuitry output coupled to the card ground connection;

wherein the main switching mechanism controls the application of power to circuitry based on an output state of the delay output.

* * * * *

UNITED STATES PATENT AND TRADEMARK OFFICE
CERTIFICATE OF CORRECTION

PATENT NO. : 6,008,550
DATED : December 28, 1999
INVENTOR(S) : Dorsey et al.

It is certified that error appears in the above-identified patent and that said Letters Patent is hereby corrected as shown below:

On the title page, between items [22] and [51] insert the following:

Related U.S. Application Data
--[63]   Continuation of Ser. No. 08/797,351, Feb. 11, 1997, Pat. No. 5,910,690.--.

In column 1, line 3, insert the following:

--This is a continuation of application Ser. No. 08/797,351, filed Feb. 11, 1997, now U.S. Pat. No. 5910,690.--.

Signed and Sealed this

Thirty-first Day of October, 2000

Attest:

Q. TODD DICKINSON

*Attesting Officer*       *Director of Patents and Trademarks*